United States Patent [19]
Loomis et al.

[11] Patent Number: 5,852,114
[45] Date of Patent: Dec. 22, 1998

[54] BIODEGRADABLE THERMOPLASTIC POLYMER BLEND COMPOSITIONS WITH ACCELERATED BIODEGRADATION

[75] Inventors: Gary L. Loomis, Morris Township; Michael J. Izbicki, Madison; Anthony Flammino, Chester, all of N.J.

[73] Assignee: Novon International, Inc., Buffalo, N.Y.

[21] Appl. No.: 407,083

[22] Filed: Mar. 20, 1995

Related U.S. Application Data

[63] Continuation of Ser. No. 147,609, Nov. 4, 1993, abandoned, which is a continuation-in-part of Ser. No. 1,873, Jan. 8, 1993, abandoned.

[51] Int. Cl.$^6$ .......................... C08L 29/04; C08L 29/02; C08L 23/08
[52] U.S. Cl. ............................. 525/57; 525/56; 523/128
[58] Field of Search ..................... 525/56, 57; 523/128

[56] References Cited

U.S. PATENT DOCUMENTS

| | | | |
|---|---|---|---|
| 1,971,662 | 8/1934 | Schmidt et al. | 262/2 |
| 2,844,570 | 7/1958 | Broderick | 260/91.3 |
| 2,990,398 | 6/1961 | Inskip et al. | 260/91.3 |
| 4,133,784 | 1/1979 | Otey et al. | 260/17.4 |
| 4,337,181 | 6/1982 | Otey et al. | 523/138 |
| 4,469,837 | 9/1984 | Cattaneo | 524/338 |
| 4,618,648 | 10/1986 | Marten | 525/60 |
| 4,673,438 | 6/1987 | Wittwer et al. | 106/126 |
| 4,675,360 | 6/1987 | Marten | 525/60 |
| 4,738,724 | 4/1988 | Wittwer et al. | 106/213 |
| 4,900,361 | 2/1990 | Sachetto et al. | 106/213 |
| 4,950,513 | 8/1990 | Mehra | 428/36.7 |
| 5,095,054 | 3/1992 | Lay et al. | 524/47 |
| 5,202,074 | 4/1993 | Schrenk | 264/241 |
| 5,462,981 | 10/1995 | Bastioli | 524/53 |

FOREIGN PATENT DOCUMENTS

| | | |
|---|---|---|
| 124336 | 11/1984 | European Pat. Off. . |
| 282368 | 9/1988 | European Pat. Off. . |
| 400532 | 12/1990 | European Pat. Off. . |
| 407350 | 1/1991 | European Pat. Off. . |
| 454850 | 11/1991 | European Pat. Off. . |
| 476415 | 3/1992 | European Pat. Off. . |
| 519367 | 12/1992 | European Pat. Off. . |
| 56-109267 | 8/1981 | Japan . |
| 0381357 | 4/1991 | Japan . |
| 04136047 | 5/1992 | Japan . |
| WO9102024 | 2/1991 | WIPO . |
| WO9214782 | 9/1992 | WIPO . |
| WO9216583 | 10/1992 | WIPO . |
| WO9216584 | 10/1992 | WIPO . |
| WO9219680 | 11/1992 | WIPO . |
| WO9309171 | 5/1993 | WIPO . |

OTHER PUBLICATIONS

Sakazawa, et al., "Symbiotic Utilization of Polyvinyl Alcohol by Mixed Cultures", Applied and Environmental Microbiology, 260–67 (1981).

Shimao, et al., "Mixed Continuous Cultures of Polyvinyl Alcohol–Utilizing Symbionts Pseudomonas Putida VM15A and Pseudomonas sp. Strain VM15C", Applied and Environmental Microbiology, 751–54 (1984).

Suzuki, et al. "Some Characteristics of Psuedomonas 0–3 Which Utilizes Polyvinyl Alcohol", Agr. Biol. Chem, 37(4) 747–56 (1973).

J.C. Young and E.R. Baumann, "The Electric Respirometer–1 Factors Affecting Oxygen Uptake Measurements", Water Research, 10, 1031–40 (1976).

*Primary Examiner*—David Buttner
*Attorney, Agent, or Firm*—Fitzpatrick, Cella, Harper & Scinto

[57] ABSTRACT

Biodegradable thermoplastic polymer blend compositions are presented in which a first polymer and a second polymer are intimately associated together in a uniform, substantially homogeneous blend. The second polymer of the composition acts to facilitate biodegradation of the composition, and of shaped articles manufactured therefrom, at a rate which is enhanced over that of the most slowly biodegrading individual polymer component of the composition. The composition may further comprise a polysaccharide component, such as a starch component like destructurized starch.

17 Claims, 9 Drawing Sheets

BIODEGRADABLE THERMOPLASTIC POLYMER BLEND COMPOSITIONS WITH ACCELERATED BIODEGRADATION

RELATED UNITED STATES PATENT APPLICATION

This is a continuation of Ser. No. 08/147,609 filed Nov. 4, 1993, now abandoned which is a continuation-in-part application from commonly assigned co-pending U.S. patent application Ser. No. 08/001,873, filed Jan. 8, 1993, now abandoned.

BACKGROUND OF THE INVENTION

1. Field of the Invention

The present invention relates to polymer blend compositions that are thermoplastic and are capable of being manufactured into shaped articles which exhibit dimensional stability. These compositions, and shaped articles manufactured therefrom, also biodegrade at an accelerated rate.

2. Description of the Related Art

Some polyhydric polymers like ethylene-vinyl alcohol copolymer, are inherently thermoplastic while other polyhydric polymers like polyvinyl alcohol, are not. For instance, polyvinyl alcohol may be melt-processed as a thermoplast only while in the presence of liquid plasticizers. Also, compositions containing polyvinyl alcohol may be processed as a thermoplast when a monomeric polyhydroxylated compound is present therein [see e.g., U.S. Pat. No. 4,469,837 (Cattaneo)] or when the polyvinyl alcohol has been internally plasticized in either a post-polymerization reaction, such as an alkoxylation reaction [see e.g., U.S. Pat. Nos. 1,971,662 (Schmidt); 2,844,570 (Broderick) and 2,990,398 (Inskip)], or a copolymerization reaction, such as with poly (alkeneoxy) acrylate [see e. g., U.S. Pat. Nos. 4,618,648 (Marten) and 4,675,360 (Marten)].

In addition, certain polyhydric polymers like polyvinyl alcohol, biodegrade at a useful rate when subjected to conditions favorable to biodegradation, with the rate of such biodegradation varying depending on the particular polyhydric polymer.

Compositions formed by mixing certain polyhydric polymers like polymers and copolymers of vinyl alcohol and vinyl acetate, particularly with elevated ethylene contents, are known to be useful for particular applications. For example, Japanese Patent Publication JP 03-81357 describes a composition having a polyvinyl acetate component whose maximum free hydroxyl content is 50%. Japanese Patent Publication JP 56-109267 describes an adhesive composition formed from a saponified ethylene-vinyl acetate copolymer with an ethylene content which is at the very least 65 mole percent and may be up to 99.7 mole percent. In addition, U.S. Pat. No. 4,950,513 (Mehra) describes a laminar article, prepared from a polyolefin blended with a minor portion of a melt blend of a nylon and a polyvinyl alcohol component, in which the different polymers form separate platelet-like layers within the article.

Starch has been mixed with polyhydric polymers (e. g., polyvinyl alcohol), with certain of such mixtures (e. g., starch-polyvinyl alcohol mixtures) reported to have been extruded into films and said to be biodegradable. See e. g., U.S. Pat. Nos. 4,133,784 (Otey) and 4,337,181 (Otey); and International Patent Publication No. WO 93/09171 (Bastioli).

In addition, International Patent Publication No. WO 92/16583 (Dake) refers to biodegradable compositions containing a starch derivative; a polymer, such as polyvinyl alcohol or ethylene-vinyl alcohol copolymers; and a plasticizer. The plasticizer is added to enable the composition to be processed as a thermoplast. Also, International Patent Publication Nos. WO 92/14782 (Bastioli) and WO 92/19680 (Bastioli) each refer to starch-containing polymer compositions, with plasticizer components added to facilitate processing of the polymer component of the composition.

Japanese Patent Publication JP 04-136047 relates to a composition containing starch and ethylene-vinyl alcohol copolymer, which may include polyvinyl alcohol as a filler. Such use of polyvinyl alcohol is not a thermoplastic one, especially when, as taught in this reference, glycerin is added to the composition as a plasticizer.

According to U.S. Pat. No. 4,673,438 (Wittwer), the disclosure of which is hereby incorporated herein by references, when starch is heated under shear in the presence of relatively small amounts of water, the resulting new starch-water composition, in the form of a melt, surprisingly has thermoplastic properties. Those thermoplastic starch compositions have become known as "destructurized starch." See also U.S. Pat. Nos. 4,738,724 (Wittwer) and 4,900,361 (Sachetto), the disclosures of which are also hereby incorporated herein by reference.

According to U.S. Pat. No. 5,095,054 (Lay), the disclosure of which is hereby incorporated herein by reference, destructurized starch may be combined with certain polymers to form thermoplastic compositions which are useful in the formation of molded articles which exhibit dimensional stability.

While the mixing together of certain polymers may endow the resulting composition with many desirable physical properties and characteristics, such as enhanced processability, the presence of some polymers in such compositions may also have the disadvantageous side effect of diminishing the rate of biodegradation of the composition. For many applications, rapid biodegradation is a highly beneficial and desired property.

The term "biodegradable" is not well defined in the art. While some thermoplastic materials which merely disassemble or disintegrate into smaller (but not biodegradable) thermoplastic pieces over time have been termed "biodegradable," a true "biodegradable" material is one that mineralizes at approximately the same rate as any organic material found in the soil, leaving no synthetic, hazardous or toxic residue. More precisely, a biodegradable material degrades through the overall transformation of a naturally occurring or synthetic organic polymer contained in the material to form gaseous end products and biomass at least in part due to the molecular phenomena of a biological system in which it is present. The use of the term "mineralization" refers to the metabolic conversion of organic compounds to naturally occurring gases, biomass and inorganic constituents. A "compostable" material is a biodegradable material that breaks down to humus, with mineralization initiated during the composting process and completed during the end use of the humus, at a rate similar to natural organic materials found in the soil, leaving no synthetic, hazardous or toxic residue.

Certain thermoplastic polyhydric polymers that are biodegradable, such as destructurized starch, and certain non-thermoplastic, but biodegradable polyhydric polymers like polyvinyl alcohol, may not always be suitable for a desired application. For instance, certain non-thermoplastic, but biodegradable polyhydric polymers may not by themselves be capable of being processed into a particular product useful for the desired application. Such is the situation with polyvinyl alcohol, which may only be process as a thermoplast in the presence of a liquid plasticizer component.

In order to facilitate the processing of non-thermoplastic, biodegradable polymers, it is often desirable to mix other polymers therewith which in part tend to lend thermoplasticity to the resulting composition. However, in so doing, the rate of biodegradation of that composition may be compromised. In addition, even the biodegradable components of the resulting composition may not biodegrade at a sufficiently rapid rate for certain applications.

Thus, while certain compositions containing mixtures of polyhydric polymers may indeed biodegrade at a satisfactory rate, others are unsatisfactory from a production standpoint as they are not inherently thermoplastic, and as such create processing obstacles to the production of useful articles of manufacture. And, while certain mixtures of polyhydric polymers may be thermoplastic, such mixtures may fail to biodegrade at a rate that is deemed acceptable to be of commercial value, especially where a product is described as "biodegradable."

SUMMARY OF THE INVENTION

It is an object of the present invention to provide a polymer blend composition that is both rapidly biodegradable and thermoplastic.

Another object of this invention is to provide articles manufactured from such compositions, which are biodegradable and exhibit dimensional stability.

These and other objects are achieved by the present invention, which relates to biodegradable thermoplastic polymer blend compositions comprising at least one first polymer and at least one second polymer intimately associated in the form of a uniform, substantially homogeneous blend. These compositions, when subjected to conditions favorable for biodegradation, biodegrade at a rate which is enhance c over the rate of the more slowly biodegradable polymer—i.e., the first polymer. Such rate enhancement is due to the presence of the second polymer.

DETAILED DESCRIPTION OF THE INVENTION

Figure 1:
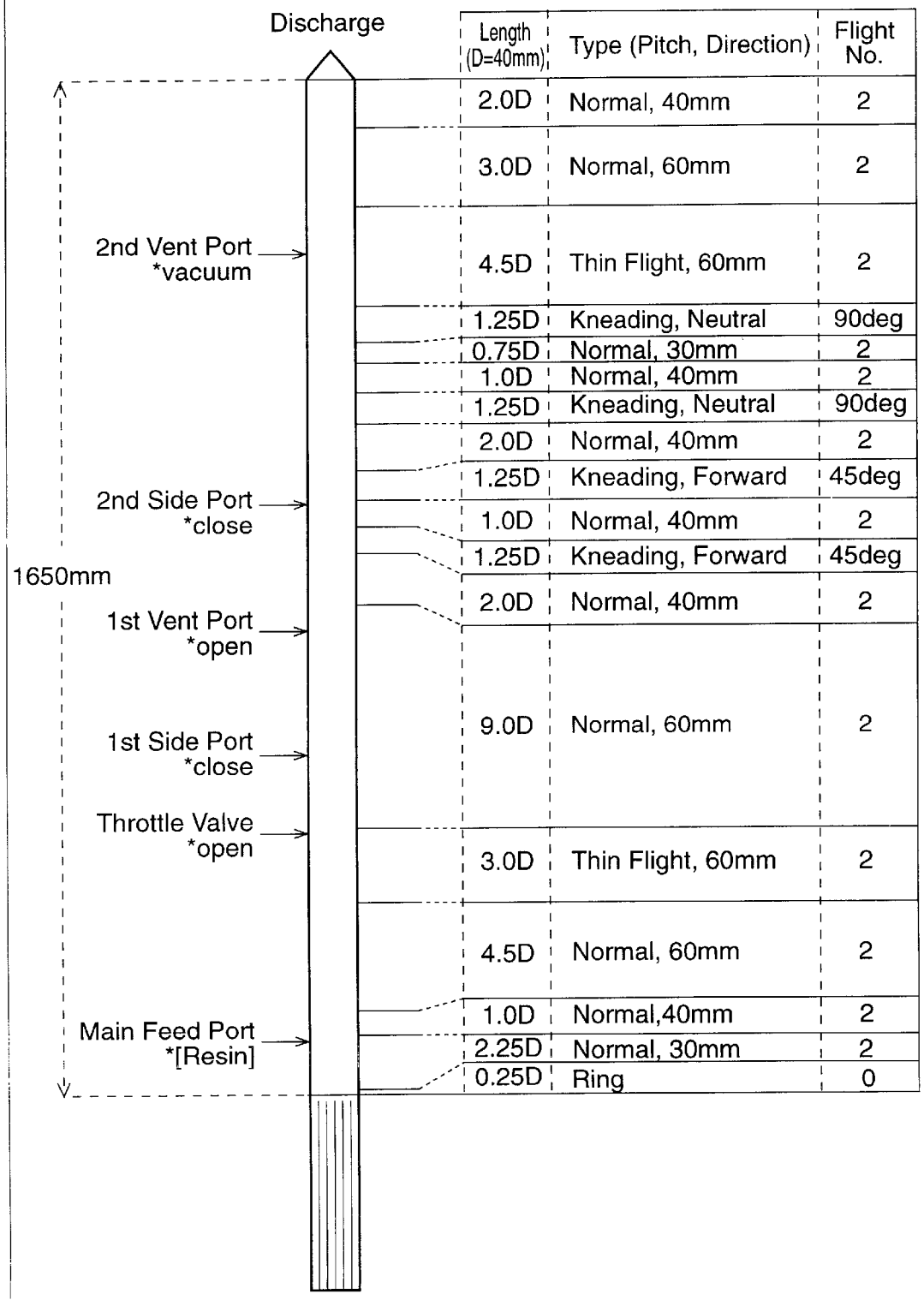
FIG. 1 depicts a screw design suitable for use in connection with an extrusion preparation of the biodegradable thermoplastic polymer blend compositions of the present invention.

The present invention provides polymer blend compositions which are both biodegradable and thermoplastic. When these compositions are subjected to conditions favorable for biodegradation, they biodegrade at a rapid rate, with the first polymer biodegrading at an enhanced rate due to the presence and action of the second polymer. Specifically, due to the accelerated rate at which the second polymer biodegrades as it is consumed by microorganisms, the rate of biodegradation of the compositions of this invention is enhanced over that of the most slowly biodegrading individual polymer component thereof and is highly commercially acceptable.

The compositions of this invention comprise at least one first polymer and at least one second polymer, in which the first polymer and the second polymer are intimately associated to form a uniform, substantially homogeneous blend. In addition, a polysaccharide component, such as a starch component like destructurized starch, may also be blended with, or added to, the compositions of the present invention to impart further desirable physical properties and characteristics.

The present invention also provides a process for preparing such biodegradable thermoplastic polymer blend compositions, the steps of which comprise: (a) providing at least one first polymer and at least one second polymer; and (b) blending the first polymer and the second polymer to form a uniform, substantially homogenous blend. The blending of the polymer components may be accompanied by melting to form a melt-blend.

The compositions of the present invention are useful in the manufacture of shaped articles which exhibit dimensional stability In preparing the compositions of the present invention, the first polymer and the second polymer may be blended in an intimate association to form a uniform, substantially homogeneous blend. The resulting blend composition exists in a "single-phase" morphology, which may often be observed to be transparent. In contrast, when the processed composition cools and solidifies, a phase-separation is observed to occur. This morphological phase-separation causes the composition to appear increasingly more opaque as it cools and solidifies. That is, the cooled and solidified composition exists in a "co-continuous phase" morphology, which may be observed when viewed at the micron level under a scanning electron microscope ("SEM").

This co-continuous phase phenomenon facilitates biodegradation of the blend compositions at a rate which is enhanced over that of the more slowly biodegrading polymer component of the composition—i.e., the first polymer. Specifically, due to its consumption by microorganisms, the second polymer causes facilitated biodegradation by creating for the first polymer a greater surface area onto which the microorganisms may grow. In addition, the second polymer, by serving a concomitant role as a nutrient for microorganism growth, assists the microorganism growth rate.

The use of the phrase "intimately associated" refers herein to, for example, the process of blending, and often melting, together the individual components of the composition—e.g., the first polymer and the second polymer—in an extruder, or any other form of intensive mixing that results in sufficient polymer interactions to provide a uniform, substantially homogeneous blend, often a melt-blend.

The first polymer and the second polymer are each biodegradable polymers, with the second polymer biodegrading a, an enhanced rate over that of the first polymer.

The first polymer of the composition may be selected from the group consisting of (i) polymers obtained by co-polymerization of vinyl acetate and an alkene, with subsequent hydrolysis of some or all of the vinyl acetate groups; (ii) polymers having free isocyanate groups obtained by reacting polyfunctional isocyanates with organic compounds containing two or more active hydrogens—i.e., polyurethanes; (iii) polymers comprising recurring amide groups as integral parts of a main chain polymer—i.e., polyamides, such as poly(hexamethylenediamine) adipate; (iv) poly-condensation products of dicarboxylic acids and glycols—i.e., polyesters, such as polyethylene terephthalate and polybutylene terephthalate; (v) polyvinyl pyrrolidone; (vi) certain hydrophobic thermoplastic polymers that are capable of biodegrading, such as polyisoprene; and combinations thereof. Preferably, an interspacing group having a relatively short alkyl chain, such as a one carbon atom to a six carbon atom chain, should be present between the hydrolyzable linkages, such as the urethane (ii), amide (iii) or ester (iv) linkage, so as to facilitate hydrolysis of the first polymer, which assists in facilitating an enhanced rate of biodegradation when the compositions are subjected to conditions favorable for biodegradation.

Suitable first polymers for use herein include copolymers of vinyl alcohol, such as ethylene-vinyl alcohol copolymer, partially-hydrolyzed ethylene-vinyl acetate copolymer, and combinations thereof. Ethylene-vinyl alcohol copolymers (having substantially no acetate functionalities remaining after hydrolysis) are preferred.

Since the physical properties and characteristics of ethylene-vinyl alcohol copolymers ("EVOH") vary as a function of the mole percent ethylene content and the molecular weight, those of ordinary skill in the art should choose an EVOH component with an appropriate balance of these physical parameters to provide a composition with desirable physical properties and characteristics. Of course, those of ordinary skill in the art will readily appreciate that it may be desirable to include as the EVOH component a combination of two or more EVOHs having different physical parameters, such as different ethylene contents and/or molecular weights (referred to herein in terms of weigh: average molecular weight or "$\overline{M_W}$").

Specifically, the EVOH component should have a molar ratio of vinyl alcohol units to alkene units within the range of from about 80:20 to about 50:50. A preferred EVOH should have a molar ratio of vinyl alcohol units to alkene units within the range of from about 73:27 to about 52:48. In addition, the molecular weight of the EVOH component—calculated from the degree of polymerization and the molecular weight of the repeating unit—preferably, should be within the range of about 5,000 $\overline{M_W}$ to about 300,000 $\overline{M_W}$, with about 60,000 $\overline{M_W}$ being most preferred. [The degree of polymerization refers to the number of times the repeating unit occurs within a given polymer. See J. R. Moore and D. E. Kline, *Properties and Processing of Polymers For Engineers*, 10, Society of Plastics Engineers, Inc., Prentice-Hall, Inc., Englewood Cliffs, N.J. (1984).]

A suitable EVOH for use as a component in the compositions of the present invention may be obtained commercially from E. I. du Pont de Nemours and Company (Wilmington, Del.), under the tradename "SELAR-OH"; EVAL Company of America (Lisle, Ill.) under the tradename "EVAL"; and Nippon Gohsei (Osaka, Japan), under the trademark "SOARNOL".

Suitable second polymers for use herein may include any polymer or copolymer that facilitates biodegradation of the composition, more specifically, biodegradation of the first polymer, at an enhanced rate when the first polymer and the second polymer are intimately associated to form biodegradable thermoplastic polymer blend compositions, and subjected to conditions favorable for biodegradation. Examples of such second polymers are those selected from the group consisting of alkenol homopolymers and copolymers, preferred of which are those that are themselves rapidly biodegradable. Such polymers and copolymers include homopolymers of polyvinyl alcohol, preferably water-soluble, partially hydrolyzed polyvinyl acetate—i.e., poly (vinyl alcohol)-co-(vinyl acetate); polyvinyl alcohol; poly (vinyl alcohol)-co-(propen-1-ol); and combinations thereof.

Other second polymers suitable for use herein include polyesters, such as polylactic acid; poly-β-hydroxyalkanoates, such as poly-β-hydroxybuytrate or poly-β-hydroxyvalerate; polycaprolactone; polyethylene adipate; polyethylene succinate; polyglycolic acid; and copolymers and combinations thereon. Additional second polymers may include polyamino acids, such as polyglycine.

PVOH is a preferred second polymer, particularly PVOH with a degree of hydrolysis within the range of from about 40% to about 98% with a range of from about 71% to about 98% being more preferred. The most preferred degree of hydrolysis for the PVOH component of the composition of the present invention is about 88%. [The degree of hydrolysis refers to the extent to which polyvinyl alcohol has been converted from polyvinyl acetate through a transesterfication (or saponification), hydrolysis or aminolysis reaction. See e.g., F. L. Morten and C. W. Zvanut, "Hydrolysis of Polyvinyl Acetate to Polyvinyl Alcohol" in *Polyvinyl Alcohol—Developments*, 57–72 (C. A. Finch, ed. 1992).]

Preferred for use herein is PVOH with a molecular weight within the range of from about 10,000 $\overline{M_W}$ to about 50,000 $\overline{M_W}$, and most preferred is PVOH with a molecular weight of about 20,000 $\overline{M_W}$.

Since the physical properties and characteristics of PVOH vary as a function of the degree of hydrolysis and the molecular weight, those of ordinary skill in the art should choose a PVOH component with an appropriate balance of these physical parameters to provide a composition with desirable physical properties and characteristics. Of course, those of ordinary skill in the art will readily appreciate that it may be desirable to include as the PVOH component a combination of two or more PVOHs having different physical parameters, such as different degrees of hydrolysis and/or molecular weights.

The PVOH component of the compositions of the present invention may be obtained commercially from the du Pont Company, under the tradename "ELVANOL"; Air Products Corp. (Allentown, Pa.), under the tradename "AIRVOL"; Hoechst-Celanese Corporation (Summit, N.J.), under the tradename "MOWIOL"; Kurraray Company Ltd. (Osaka, Japan), under the tradename "POVAL"; and Wacker Chemicals USA, Inc. (New Canaan, Conn.), under the tradename "POLYVIOL".

In the compositions of the present invention, the first polymer and the second polymer should be melted and blended together in relative amounts sufficient to prepare a composition that is biodegradable with thermoplastic properties. The first polymer may be included in the compositions in an amount within the range of from about 20% to 80% by weight of the total composition, and the second polymer in an amount within the range of from about 10% to about 70% by weight of the total composition.

Preferably, from the standpoint of biodegradability, the first polymer should be EVOH (with a 27 mole percent ethylene content, and a molecular weight of about 60,000 $\overline{M_W}$) and the second polymer should be PVOH (with a degree of hydrolysis of about 88%, and a molecular weight of about 20,000 $\overline{M_W}$—e.g., "AIRVOL" 205) in a ratio of about 50:50 by weight. On the other hand, from the standpoint of processability, the first polymer should be EVOH (with a 44 mole percent ethylene content, and a molecular weight of about 60,000 $\overline{M_W}$) and the second polymer should be PVOH (with a degree of hydrolysis of about 88%, and a molecular weight of about 20,000 $\overline{M_W}$—e.g., "AIRVOL" 205) in a ratio of about 60:40 by weight. Of course, it is to be understood that in the general context of the present invention, the rate of biodegradation of the compositions should be observed to increase as the amount of the PVOH component increases in the composition. Moreover, the processability of the compositions of the present invention should be observed to increase as the ethylene content of the EVOH component in the composition and/or in the amount of the EVOH component itself increases in the composition. In that regard, those of ordinary skill in the art should make appropriate choices among the given variables for the EVOH and the PVOH components to attain a resulting polymer blend composition with the desired biodegradability, processability and physical properties and characteristics.

A polysaccharide component may also be included with, or added as an extender or filler to, the first polymer—e.g., EVOH—and the second polymer—e.g., PVOH—and blended therewith to attain a biodegradable thermoplastic polymer blend composition with desirable physical properties and characteristics. Suitable polysaccharide components may be selected from the group consisting of a starch component, celluloses, glycoproteins, alginates, pectins, agaroses, carrageens and combinations thereof. For a more detailed and comprehensive discussion of suitable polysaccharide components, see M. Yalpani, Polysaccharides, Elsevier (1988).

For instance, a composition of the present invention prepared from a first polymer and a second polymer may also include a starch component to impart certain physical properties and characteristics to the resulting composition making it particularly advantageous for certain applications, such as for compost bags, where rapid disintegration of the processed material is desirable.

Whether as a component included in the uniform, substantially homogeneous blend or as an extender or filler added thereto, starch is advantageously contained in the compositions of the present invention since it (1) is inexpensive especially when compared with the cost of many of the polymers or copolymers useful herein as the first polymer or the second polymer; (2) is readily biodegradable; (3) may be blended readily with both thermoplastic polymers and non-thermoplastic polymers to form uniform, substantially homogeneous melt blends; and (4) does not disrupt the co-continuous phase morphology which is observed in the compositions of the present invention when cooled and solidified.

A starch component suitable for use herein may be chosen from a native or granular starch, a chemically modified starch (i.e., a starch derivative), gelatinized starch [such as a starch-based material prepared in accordance with U.S. Pat. No. 3,137,592 (Protzman)], as well as destructurized starch [such as destructurized starch prepared in accordance with U.S. Pat. No. 35 4,673,438 (Wittwer)] or combinations thereof. In addition, the starch component may be present in the composition in an amount within the range of from about 5% to about 50% by weight, preferably about 33% by weight, of the total composition.

The starch component may be a native or granular starch selected from the group consisting of potatoes, rice, tapioca, corn, peas, rye, oats, wheat and combinations thereof. Alternatively, the starch may be a starch derivative, which derivative may be selected from the group consisting of starch esters, starch ethers and combinations thereof.

The starch esters suitable for use in the compositions of the present invention may be selected from the group consisting of methyl esters, ethyl esters, propyl esters, butyl esters, propionates, butyrates, and esters of saturated and unsaturated branched and straight-chain organic acids, having from about five to about twelve carbon atoms.

The starch ethers suitable for use in the compositions of the present invention may be selected from the group consisting of alkylethers, hydroxyalkylethers, hydroxyalkylalkylethers, methyl ethers, ethyl ethers, propyl ethers, butyl ethers, hydroxymethyl ethers, hydroxyethyl ethers, hydroxypropyl ethers, hydroxyethyl methylethers, hydroxypropyl methylethers and combinations thereof.

The degree of substitution of these starch derivatives—i.e., the average number of hydroxyl groups on each glucopyranosyl unit which are derivatized by substituents [see M. W. Rutenberg and D. Solerak, "Starch Derivatives: Production and Uses" in *Starch: Chemistry and Technology*, 311, 313 n.1 (2d ed. 1984)]—may be within the range of from about 0.1 to about 3.0. However, it is preferred that the degree of substitution of the starch derivative is at least about 0.8, and more preferred that it is from about 0.8 to about 2.1.

When the starch component is a starch derivative such as a starch ester, like a starch acetate, it is preferred that the starch component has a degree of substitution within the range of from about 0.5 to about 1.8, and more preferred that the range is from about 0.7 to about 1.8, and most preferred that the range is from about 0.8 to about 1.5. Alternatively, when the starch component is a starch derivative such as a starch ester, like a starch propionate, it is preferred that the starch component has a degree of substitution within the range of from about 0.5 to about 1.6, and more preferably within the range of from about 0.7 to about 1.4.

When the starch component of the composition of the present invention is destructurized starch, the starch used to prepare the destructurized starch may be chosen from a native or granular starch, which may be selected from the group consisting of potatoes, rice, tapioca, corn, peas, rye, oats, wheat and combinations thereof; a starch derivative, with a degree of substitution within the range of from about 0.1 to about 3.0; gelatinized starch; and combinations thereof.

The starch component, as noted above, may be a granular or native starch, a starch derivative, gelatinized starch, destructurized starch or combinations thereof. However, when native or granular starch, or any other starch with at least some degree of granular structure (e.g., starch derivative or gelatinized starch), is used as the starch component, it is believed that the biodegradation of the starch component, whose rate of biodegradation is typically greater than that of the first polymer or the second polymer, will leave a void in the resulting composition, or shaped article manufactured therefrom, thereby creating a greater surface area onto which microorganisms may grow when subjected to conditions favorable for biodegradation.

Suitable for use in the compositions of the present invention are water-soluble and water-swellable celluloses, examples of which include alkylcelluloses like methyl cellulose; hydroxyalkylcelluloses and hydroxyalkylalkylcelluloses like hydroxymethyl cellulose, hydroxyethyl cellulose, hydroxypropyl cellulose, hydroxyethyl methylcellulose, hydroxypropyl methylcellulose and hydroxybutyl methylcellulose; cellulose esters and hydroxyalkylcellulose esters like cellulose acetylphthalate; carboxyalkylcelluloses; carboxyalkyl-cellulose esters like carboxymethyl cellulose and salts thereof; and combinations thereof.

Optional components, which may also be added to the compositions of the present invention to impart further desirable physical properties and characteristics, may be selected from the group consisting of extenders; fillers; lubricants; mold-release agents; flame retardants; boron-containing compounds; ultraviolet stabilizers; coloring agents; anti-oxidants and combinations thereof. To the composition of the present invention may still further be added as a component a plasticizer, the addition of which tends to form a softer, more readily processable composition.

While it is not necessary to add as a component a plasticizer to practice the present invention, a plasticizer component may be added in an amount within the range of from about 0.5% to about 15% by weight, and preferably within the range of from about 0.5% to about 5% by weight. Plasticizers suitable for use herein include low molecular weight polyols, such as poly (ethylene glycols), poly (propylene glycols) and poly(ethylene-propylene glycols ) like glycerol; butenediol; propylene glycol; sorbitol; and combinations thereof.

Suitable fillers for use herein may include, in addition to starch, oxides of magnesium, aluminum, silicon, and titanium; wood derived materials; cellulose fibers; and combinations thereof. The fillers may be present in the composition in an amount as great as about 20% by weight, and preferably within the range of from about 3.0% to about 10% by weight of the total composition.

Examples of extenders suitable for use herein may include, in addition to starch, gelatin, vegetable proteins (e.g., sunflower proteins, soybean proteins, cotton seed proteins, peanut proteins or rape seed proteins) and combinations thereof. While such extenders may be added in any desired amount, preferably they should be added in an amount as great as about 20%, and more preferably within the range of from about 3% to about 10% by weight of the total composition.

Suitable lubricants for use herein may include stearates of aluminum, calcium, magnesium, zinc and tin, as well as their free acids; magnesium silicate; silicones; lecithin; mono-, di- and tri-glycerides, like boeson; and combinations thereof. Particularly preferred lubricants are stearic acid or lecithin.

Suitable stabilizers for use herein may include anti-oxidants, such as thiobisphenols, alkylidenbisphenols, secondary aromatic amines and the like; stabilizers against photo-decomposition, such as ultraviolet absorbers and quenchers; hydroperoxide decomposers; free radical scavengers; anti-microbial agents; and combinations thereof.

Suitable coloring agents for use herein may include azo dyes; organic or inorganic pigments; coloring agents of natural origin and combinations thereof, of which inorganic pigments, such as the oxides of iron or titanium, are preferred. Such coloring agents may be present in the composition in an amount within the range of from about 0.01% to about 10% by weight, and preferably in an amount within the range of from about 0.05% to about 3% by weight. Most preferably, the coloring agents may be present in the composition in an amount within the range of from about 0.03% to about 0.07% by weight of the total composition.

To the compositions of the present invention may also be added flame-retardants such as phosphorous-, sulphur-, and halogen-containing flame retardants and combinations thereof. For examples of such flame retardants, see Dake.

Other materials may also be added to the composition of the present invention, including boron-containing compounds. The presence of such boron-containing compounds in the composition is believed to improve the transparency, modulus and tear strength of a shaped article manufactured from the inventive compositions taught herein, and are particularly useful for those compositions which are destined to be formed into films, sheets or fibers. The preferred boron-containing compounds are boric acid, metaboric acid and alkali and alkaline earth metal salts; borax and derivatives thereof; and combinations thereof. The boron-containing compounds may be present in the composition in an amount within the range of about 0.002% to about 0.4% by weight, and preferably from about 0.01% to about 0.3% by weight of the total composition.

Salts of alkali or alkaline earth metals, such as inorganic salts like chlorides of lithium and sodium may also be added to the composition of the present invention in an amount within the range of from about 0.1% to about 5% by weight of the total composition. The presence of such salts in the composition is believed to still further improve the transparency, modulus and tear strength of articles of manufacture produced from a composition containing the same.

The present invention is further directed to a method for preparing biodegradable thermoplastic polymer blend compositions as taught herein, which comprises the steps of: (i) providing at least one first polymer and at least one second polymer; and (ii) blending the first polymer and the second polymer to form a uniform, substantially homogeneous blend. This blend may be a melt-blend provided that appropriate conditions are chosen to process the components of the composition.

In compositions prepared from a first polymer, a second polymer and a polysaccharide component, such as a starch component, the starch component may be processed—e.g., gelatinized or destructurized—independently from the first polymer and the second polymer, and then included in, or added to, the composition either before or after processing the components used to form the composition. Alternatively, the starch component may be included in the composition while processing the first polymer and the second polymer into the uniform, substantially homogeneous uniform blend.

The observed change in morphology from single-phase to co-continuous phases is reversible; that is, once the composition has been formed and, for example, extruded into a pellet, the extruded pellets may thereafter be used to process further the composition into a shaped article. Where polymer components in addition to the first polymer and the second polymer (and/or when combinations of the first polymer and/or the second polymer) are employed to form the composition, poly-continuous phases may be observed in the morphology of the cooled and solidified composition depending on the particular polymer components chosen.

In accordance with the present invention, the compositions may be prepared by subjecting the components used to form the inventive compositions to conditions of intensive mixing, with elevated temperature, such as the conditions that are achieved within the screw and barrel of an extruder. The first polymer and the second polymer, and optionally a polysaccharide component, such as a starch component, may be introduced to intensive mixing conditions in the form of granules, pellets or powders, or in a plasticizer as slurries or solutions thereof. Other optional components may be include: in the composition in granular, pellet or powder form, or in a plasticizer as slurries or solutions thereof.

During preparation of the compositions, these components may be added individually or as a mixture. For example, EVOH may be added initially to an extruder in either granule, pellet or powder form, with PVOH added downstream. Extruders suitable for use in preparing the blend compositions of the present invention include but are not limited to Brabender twin-screw extruders [such as those equipped with a screw having a geometry of L/D=12 (Brabender, Inc., Hackensack, N.J.)], Berstorff twin-screw extruders [such as those equipped with a screw having a geometry of L/D=38 (Berstorff GmbH, Hannover, Germany)], Leistritz twin-screw extruders [such as those equipped with a screw having a geometry of L/D=26 (American Leistritz Extruder Corp., Sommerville, N.J.)] and Werner-Pfleiderer twin-screw extruders [such as those equipped with a screw having a geometry of L/D=40 (Werner-Pfleiderer Co., Saddlebrook, N.J.)]. With extruders having a larger manufacturing capacity, such as the above-noted Werner-Pfleiderer extruder, the order of addition of the components may be varied or all of the components may be added to the extruder substantially contemporaneously.

With the above-noted Brabender and Berstorff extruders, the first polymer—e.g., EVOH—may be introduced to the extruder in a first feed hopper and mixed for a time sufficient to form a melt of that polymer. Downstream of the first feed hopper, the second polymer—e.g., PVOH—may be introduced to the now-molten first polymer, with the temperature of the extruder controlled to maintain an isothermal process. The screw of the extruder is designed with a high shear section to ensure that the polymer components become intimately associated. A suitable screw design for purposes of the present invention is shown in FIG. 1.

Where a plasticizer is chosen to be added to compositions of the present invention, EVOH may be added as a slurry or solution in the plasticizer. The PVOH may then be added to the extruder in appropriate amounts to achieve the desired physical properties and characteristics of the resulting composition.

Processing under the intensive mixing conditions described herein should be continued at a temperature that is greater than the melting point of the first polymer, which itself is typically lower than the melting point of the second polymer, and for a time sufficient to cause the first polymer and the second polymer (and other optional components) to become intimately associated by way of blending to form a uniform, substantially homogeneous blend, and under appropriate conditions a melt-blend.

A solution preparation may also be employed to process the first polymer and the second polymer into the compositions of the present invention. In such a preparation, the first polymer—e. g ., EVOH—and the second polymer—e.g., PVOH—may be blended together in an appropriate solvent, such as 2-propanol-water, at an elevated temperature, but a temperature that is below the boiling point (about 70° C.) of 2-propanol. The composition may then be poured into a container containing a rapidly stirred non-solvent (i.e., a liquid chemical, in which none of the components of the composition are soluble), such as n-butanol, at about room temperature or lower. By so doing, a polymer blend composition according to this invention may be isolated from the solution as a precipitate.

The components used to prepare the composition of the present invention may be processed initially into a uniform, substantially homogeneous blend, whereupon cooling, a granule, pellet or powder of the resulting blend compositions is formed. Thereafter, the granule, pellet or powder of the blend composition may be processed further into shaped articles of manufacture. Suitable processes to prepare such shaped articles include injection molding, compression molding, extrusion film casting, blow molding, vacuum forming, thermoforming, profile extrusion, co-extrusion, foaming, film blowing, melt spinning and combinations thereof. The shaped articles of manufacture which may be prepared in this manner include, but are not limited to, bottles or containers especially suitable for non-liquid products; sheets suitable for use in the production of food product tubs, beverage lids, packaging inserts, and the like; films suitable for use in the production of sacks or bags, like compost bags or liners for garbage receptacles, or components, such as a back sheet for disposable diapers, and the like; pipes suitable for use in the production of pen barrels, beverage straws, and the like; rods suitable for use in the production of cotton swab sticks and the like; multilayer packaging materials like coextruded or laminated films and the like; foams such as thermoformed foams for packaging material, such as loose-fill and the like; melt-spun fibers like woven and non-woven goods, such as textiles; and devices for the controlled delivery of pharmaceuticals or agricultural chemicals.

The composition of the present invention, and shaped articles of manufacture prepared therefrom, are "subjected to conditions favorable for biodegradation" when brought into contact with microorganisms that cause the composition to disintegrate into fragments which are further degraded, ultimately yielding inorganic materials. This typically involves subjecting the composition to biological waste water treatment systems; composting systems; biologically active landfills; non-sterile soils; aquatic environments; sediments of aquatic environment; and the like.

The addition of biodegradable polymers to biologically active environments affects the conditions within that environment. Put another way, microorganisms and their population distribution in a mixed culture adapt rapidly to altered environmental conditions. The adaptation period is time dependant and requires a nutrient supply to maintain such organisms. For a discussion of some of such microorganisms, see e.g., T. Suzuki et al., "Some Characteristics of Pseudomonas O-3 which Utilizes Polyvinyl Alcohol," *Agr. Biol. Chem.*, 37(4), 747–56 (1973); C. Sakazawa et al., "Symbiotic Utilization of Polyvinyl Alcohol by Mixed Cultures," *Appl. Env'tl Microbio.*, 41(1), 261–67 (1981); and M. Shimao et al., "Mixed Continuous Cultures of Polyvinyl Alcohol-Utilizing Symbionts *Pseudomonas putida* VM15A and Pseudomonas sp. Strain VM15C," *Appl. Env'tl Microbio.*, 48(4), 751–54 (1984).

During biodegradation of the compositions of the present invention, the second polymer—e.g., PVOH—biodegrades at an enhanced rate as compared with that of the first polymer—e.g., EVOH—and provides a suitable nutrient supply for the microorganisms to grow (at least during the adaptation period). In addition, the second polymer enhances the growth rate of the microorganisms that are capable of degrading the first polymer. Accordingly, such microorganisms are present in a greater percentage of the total biomass (i.e., the composition) than otherwise possible.

The biodegradation of the first polymer—e.g., EVOH—is surprisingly sensitive to the total available surface area thereof in the composition. To exploit this surprising sensitivity, the surface area of the first polymer is increased at least in part by the biodegradation of the second polymer—e.g., PVOH—and its rapid removal (through its consumption by microorganisms) from the composition. To exploit further this sensitivity, it may also be desirable to increase the surface area of the first polymer by controlling the diameter of the domain in which the second polymer is present in the composition.

The following examples are provided herein for purposes of illustration, and are in no way intended to limit the teaching of this invention.

EXAMPLES

Biodegradable thermoplastic polymer blend compositions were prepared according to the present invention, in which the ethylene content of the EVOH; the molecular weight of the EVOH; the degree of hydrolysis of the PVOH; the molecular weight of the PVOH; and the by weight ratio of the EVOH to the PVOH has been varied to illustrate the physical properties and characteristics of the compositions, and shaped articles manufactured therefrom, attained by such variation. Those illustrations are set forth in the tables associated with the respective examples.

Examples 1 through 9 illustrate the thermoplasticity of the blend compositions of this invention, and the physical properties and characteristics associated with the shaped articles manufactured therefrom. Examples 10 and 11 illustrate the biodegradability of the blend compositions.

While the compositions of these examples were prepared using twin-screw extruders, such as those manufactured by Brabender, Berstorff, Leistritz and/or Werner-Pfleiderer, other thermoplastic compounding techniques known in the art may be used to prepare the inventive compositions having physical properties and characteristics consistent with the teaching herein.

Extrusion Preparation Method

In the examples which follow, biodegradable thermoplastic polymer blend compositions were prepared from PVOH and EVOH by the following extrusion process. PVOH and EVOH, each in the form of coarse powders, having a particle size of about 200 microns, were pre-mixed for a period of time of about 15 minutes in a Collette GRAL 75 low-intensity mixer (Collette Machine, Wommelgm, Belgium) set at low speed. These powders were then fed into a Berstorff twin-screw extruder, with a L/D=38, and a screw designed with a diameter of 25 millimeters. The screws used in the extruder were fabricated from right-handed low compression, high compression, and right-handed kneading elements in three zones.

The components of the composition may be introduced into the first zone of the extruder, which contains low compression elements. During this introduction, the first zone (i.e., the feed zone) may be heated to a temperature within the range of from about 20° C. to about 130° C. This first zone may also contain a vent to remove any water from the components of the composition which may vaporize during processing. The next zone of the extruder is a blending zone, which may be heated to a temperature within the range of from about 170° C. to about 205° C. This blending zone contains six kneading elements and five high compression elements in an alternating configuration to further melt blend the components. Finally, the last zone of the extruder consists of six high compression elements, which are maintained at a temperature within the range of from about 210° C. to about 225° C. A three strand die is positioned at the point on the extruder where processing terminates so that an extrudate is formed into the shape of the die at that same temperature within the range of from about 210° C. to about 225° C.

The extruder was operated at about 225 rpm and a resulting die pressure of about 50 bar to produce a biodegradable thermoplastic polymer blend composition in pellet form at a throughput rate of about 7 kilograms/hour.

EXAMPLE 1

In accordance with the method described above, compositions were prepared using "EVAL" L101A (with an ethylene content of about 27 mole percent, and a molecular weight of about 132,00 $\overline{M_w}$)) EVOH and "AIRVOL" 205 (with a degree of hydrolysis of about 88% and a molecular weight of about 20,000 $\overline{M_w}$) PVOH in several different by weight ratios. A composition prepared from 100% EVOH was used for comparative purposes. All of these compositions were extrusion cast into nd injection molded into tensile bars. Some physical properties and characteristics are presented below in Table I.

TABLE I

EVOH: 27 mole percent ethylene content, with $\overline{M_w}$ = 132,000
PVOH: 88% hydrolysis, with $\overline{M_w}$ = 20,000

| Blend | EVOH:PVOH | Tensile Modulus[a]<br>Kpsi (MPa/6.9) | Viscosity[b]<br>Pa · s | WVTR<br>g/mil/100 in$^2$/day |
|---|---|---|---|---|
| A | 100:0 | 750 | 257 | 44.5 |
| B | 90:10 | 800 | 245 | 105.4 |
| C | 83:17 | 860 | 240 | 250.8 |
| D | 66:34 | 880 | 255 | 369.3 |
| E | 50:50 | 920 | 253 | 512.0 |
| F | 50:50[d] | 900 | 250 | 750.0 |
| G | 34:66 | 980 | 230 | 843.2 |

[a] test method is ISO R527, 2 mm thick test bar, speed C
[b] at a shear rate of 2,000 (s$^{-1}$) as measured on Geottfert Rheograph at 210° C.
[c] PVOH: 71% hydrolysis, $\overline{M_w}$ = 20,000

Rheology

Rheological analyses were performed with a Geottfert Rheograph Model 2002 (Geottfert Industries, Winchester, Mass.), with a L/D=30, to determine the processability of the blend compositions. Each composition was analyzed at a shear rate of about 2000 s$^{-1}$ and a temperature of about 210° C. The apparent viscosity was used as a measure of processability.

Figure 2:
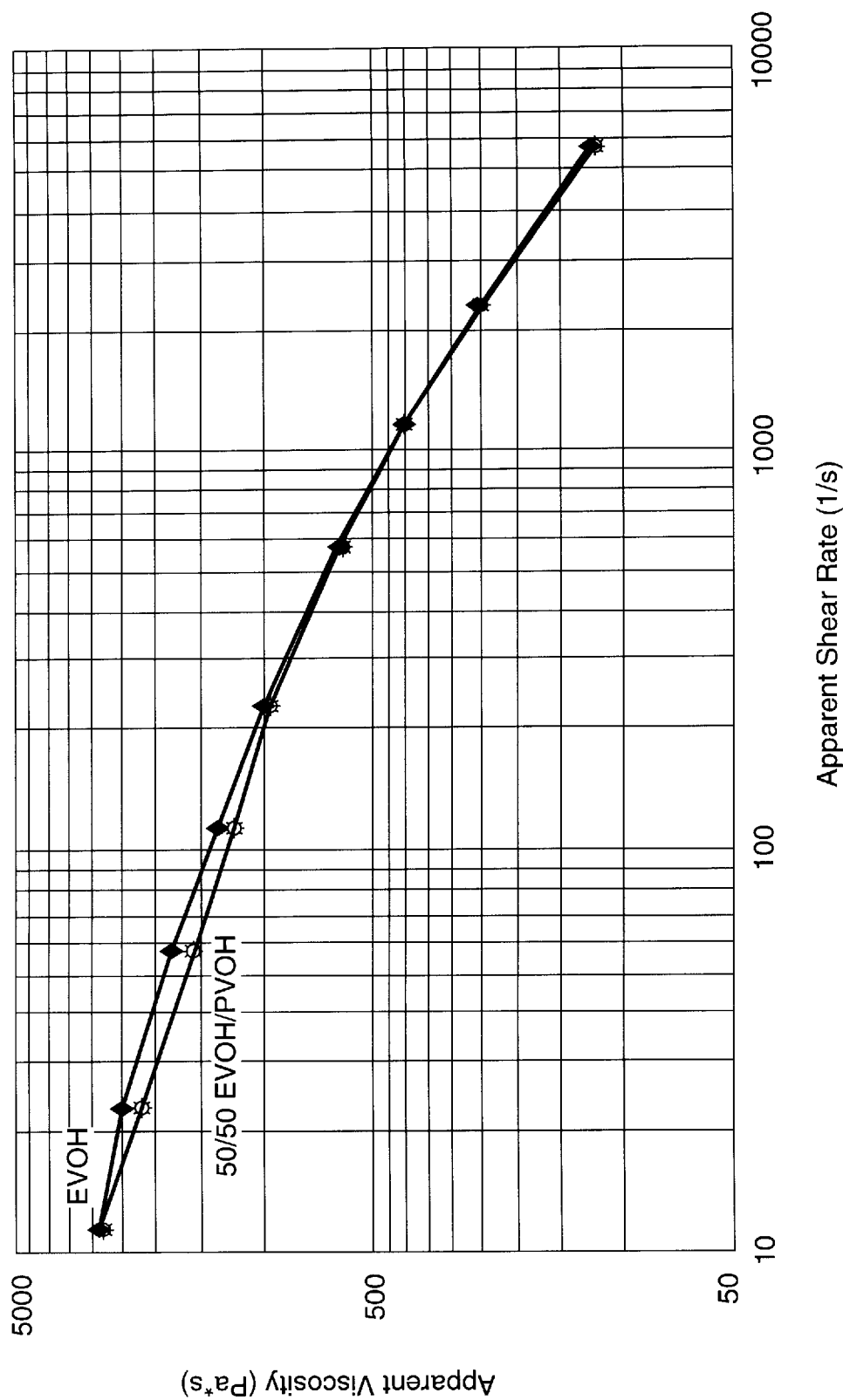
FIG. 2 is a chart showing the comparable viscosity of a composition prepared from 100% "EVAL" L101A (27 mole percent ethylene, 132,000 $\overline{M_w}$) ethylene-vinyl alcohol copolymer ("EVOH") with a blend composition prepared from that EVOH and "AIRVOL" 205 (88% hydrolysis, 20,000 $\overline{M_w}$) polyvinyl alcohol ("PVOH") in a ratio of about 50:50 by weight.

As seen from Table I, the processability of the blend compositions as reflected through its surprising Theological behavior for blend compositions 1(B) through 1(G), insofar as the apparent viscosities with respect to apparent shear rates of the blend compositions were comparable to that of the composition prepared from 100% EVOH [composition 1(A)]. Despite having been prepared in part from a non-thermoplast—PVOH—, the viscosities of the blend compositions were observed to be comparable to that of a composition prepared entirely from a thermoplast. For a comparison of the processability of blend composition 1(E) with composition 1(A), see FIG. 2.

Film Extrusion of Blend Compositions.

To extrude films, the compositions were introduced into a 0.75 inch Brabender single-screw extruder (L/D=20), equipped with a 4 inch ribbon die. The temperature profile for the extruder barrel was set at 220° C./220° C./215° C.; the screw speed was set at 40 rpm; the resulting die pressure was about 1500 psi; and the throughput was observed to be about 1.5 kilogram/hour. As the extrudate left the extruder, it was passed through a series of chilled take-up rollers and wound on a spindle. Alternatively, to extrude films in a larger volume, the compositions were introduced into a 36 millimeter Leistritz single-screw extruder (L/D=26) equipped with a 12 inch film die. The temperature profile for the extruder barrel was set at 162° C./190° C./205° C./220° C./215° C.; the screw speed was set at 40 rpm; the resulting die pressure was about 870 psi; and the throughput was observed to be about 14 kilograms/hour. As with the Brabender extruder, the extrudate was passed through a series of chilled take-up rollers as it left the extruder and wound on a spindle.

Water Vapor Transmission Rate of Film

The water vapor transmission rate ("WVTR") was determined by analyzing two-inch films extruded from these compositions with a Mocon Permatron-W Twin WVTR analyzer (Modern Controls inc., Minneapolis, Minn.). The films were masked with foil and conditioned at a temperature of about 23° C. and a relative humidity of about 100% RH for a period of time of about 16 hours. After conditioning, the films were analyzed and determined to have a WVTR of 24.4 grams/mil/100 square inches/day using, for comparative purposes, a 0.92 mil polyester standard with a zero set point.

Injection Molding of Blend Compositions

Blend compositions 1(B) through 1(G), as well as composition 1(A), were injection molded into 2 millimeter tensile bars using a Cincinnati Milacron ACT 75 (Cincinnati Milacron Inc., Cincinnati, Ohio). During the injection molding process, the injection pressures were set at and held within the range of from about 10,000 psi to about 22,000 psi, the particular pressure depending on the components of the composition, and the cycle times were set at and held within the range of from about 23 seconds to about 28 seconds.

Physical Properties and Characteristics of Injection Molded Tensile Bars

Once manufactured, the tensile bars were analyzed immediately after injection molding and after conditioning for a period of time of about 7 days in an environment having a relative humidity of about 10% and about 90% RH. As the amount of the PVOH component of the blend compositions used to prepare the molded tensile bars increased, the modulus was observed to increase. These observations were made with the conditioned tensile bars and those tensile bars that were tested after molding, without conditioning. In addition, the modulus observations made of the tensile bars prepared from the blend compositions were determined to be within the range of typical thermoplastic materials.

Like the WVTR observations made of the films, the modulus observations made of the tensile bars correlate well to the relative amount and specific EVOH and PVOH components used in the particular blend composition.

Morphology

The morphology of blend compositions 1(E) and 1(F) was observed under a scanning electron microscope ("SEM") after the compositions were extracted using the method described below.

Extraction Method

Water was used to extract the PVOH component from the blend compositions, as PVOH is known to be soluble in water, while EVOH is known to be insoluble in water. Extractions were performed with the blend compositions in a powder form and as an extruded film.

Powder Extraction

To extract the PVOH component from a blend composition in powder form, the composition was initially granulated or pulverized and then stirred in distilled, de-ionized water at room temperature for a period of time of about 4.5 hours. The stirred composition was then vacuum filtered through a filter paper having a filter size of about 230 microns, and dried in vacua at a temperature of about 50° C. for a period of time of about 24 hours at a temperature of about 50° C. This dried residue was then re-extracted using that procedure two additional times to remove essentially all of the PVOH component therefrom.

Film Extraction

To extract the PVOH component from the blend compositions extruded into film, a 4"×5" cut piece of the film was placed in a Salt Hill film washer (Salt Hill Co, White Plains, N.Y.), with stainless steel clips used to secure the film as it was extracted. The film was washed with a constant purging through the washer, rinsed with distilled, de-ionized water, and thereafter dried in vacua for a period of time of about 24 hours.

SEM Observations

To observe the morphology of the extracted blend compositions, the dried residue from the powder extraction above was then mounted to a stub, using backless double faced tape, and sputter coated, under a vacuum, using a Denton DSK2 Sputter Coater (Denton Vacuum Co., Cherry Hill, N.J.) with a gold-palladium alloy. Once coated, the residue was observed with a scanning electron microscope (Cambridge 360, Cambridge Microscope Co., Cambridge, England) at several magnifications—e.g., 50×, 500×, 2500× and 5000×—using a tungsten filament.

Figure 3:
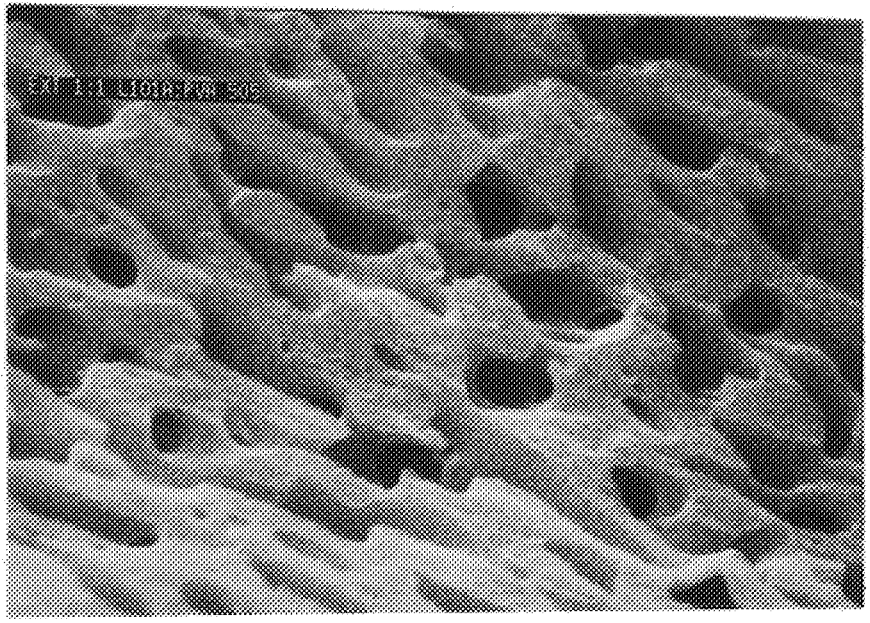
FIG. 3 is a photomicrograph of a blend composition prepared from "EVAL" L101A EVOH and "POLYVIOL" 505 (71% hydrolysis, 20,000 $\overline{M_w}$) PVOH in a ratio of about 50:50 by weight, after extraction, at a 5000× magnification.

As seen from FIG. 3, which is a photomicrograph of extracted blend composition 1(E) [prepared from "EVAL" L101A EVOH and "POLYVIOL" 505 (with a degree of hydrolysis of about 71%, and a molecular weight of about 20,000 $\overline{M_w}$) PVOH in a ratio of about 50:50 by weight], the composition is observed to have a highly porous, sponge-like surface. The remnants of the domains in the composition occupied by the PVOH component prior to the extraction appeared to penetrate the composition in a uniformly dispersed manner.

Figure 4:
FIG. 4 is a photomicrograph of a blend composition prepared from "EVAL" L101A EVOH and "AIRVOL" 205 PVOH in a ratio of about 34:66 by weight, after extraction, at a 5000 × magnification.

In FIG. 4, which is a photomicrograph of extracted blend composition 1(F) [prepared from "EVAL" L101A EVOH and "AIRVOL" 205 PVOH in a ratio of about 34:66 by weight], it is seen that the phases have become inverted. That is, instead of observing She extracted composition as a sponge-like matrix of the remaining EVOH component, the EVOH component channeled through a matrix of the PVOH component, and following water extraction, the remaining EVOH component was released in fibrous form.

EXAMPLE 2

In accordance with the preparation method described above, one set of blend compositions were prepared using "EVAL" F101A (with an ethylene content of about 32 mole percent, and a molecular weight of- about 132,000 $\overline{M_w}$) EVOH and "AIRVOL" 205 PVOH in three different by weight ratios.

Another set of blend compositions were prepared using "EVAL" L101B (with an ethylene content of about 32 mole percent, and a molecular weight of about 113,500 $\overline{M_w}$) EVOH and "AIRVOL" 205 PVOH in a ratio of about 50:50 by weight. A composition prepared from 100% of each of the 32 mole percent ethylene EVOHs was used for the respective comparisons. All of these compositions were extrusion cast into films and were injection molded into tensile bars. Some physical properties and characteristics are presented below in Tables II(a) and II(b).

TABLE II (a)

EVOH: 32 mole percent ethylene content, with $\overline{M_w}$ = 132,000
PVOH: 88% hydrolysis, with $\overline{M_w}$ = 20,000

| Blend | EVOH:PVOH | Tensile Modulus[a] Kpsi (MPa/6.9) | Viscosity[b] Pa · s | WVTR g/mil/100 in²/day |
|---|---|---|---|---|
| A | 100:0 | 695 | 240 | 34.2 |
| B | 83:17 | 740 | 234 | 94.3 |
| C | 66:34 | 790 | 238 | 207.5 |
| D | 50:50 | 880 | 239 | 311.6 |

[a]test method is ISO R527, 2 mm thick test bar, speed C
[b]at a shear rate of 2,000 (s⁻¹) as measured on Geottfert Rheograph at 210° C.

TABLE II (b)

EVOH: 32 mole percent ethylene content, with $\overline{M_w}$ = 113,500
PVOH: 88% hydrolysis, with $\overline{M_w}$ = 20,000

| Blend | EVOH:PVOH | Tensile Modulus[a] Kpsi (MPa/6.9) | Viscosity[b] Pa · s | WVTR g/mil/100 in²/day |
|---|---|---|---|---|
| E | 100:0 | 740 | 230 | 612 |
| F | 50:50 | 925 | 270 | 3351 |

[a]test method is ISO R527, 2 mm thick test bar, speed C
[b]at a shear rate of 2,000 (s⁻¹) as measured on Geottfert Rheograph at 210° C.

The results illustrated in Tables II(a) and II(b) are consistent with those obtained in Example 1.

Morphology

Extraction

Blend composition 2(D) was ground into a powder and extracted according to the method described above.

SEM Observations

Figure 5:
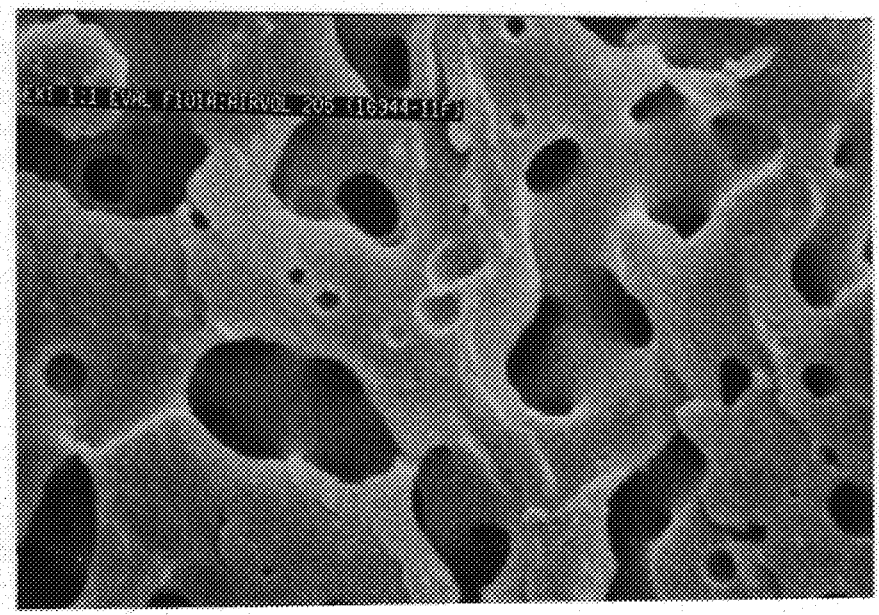
FIG. 5 is a photomicrograph of a blend composition prepared from "EVAL" F101A (32 mole percent ethylene, 132,000 $\overline{M_w}$) EVOH and "AIRVOL" 205 PVOH in a ratio of about 50:50 by weight, after extraction, at a 5000× magnification.
Figure 6:
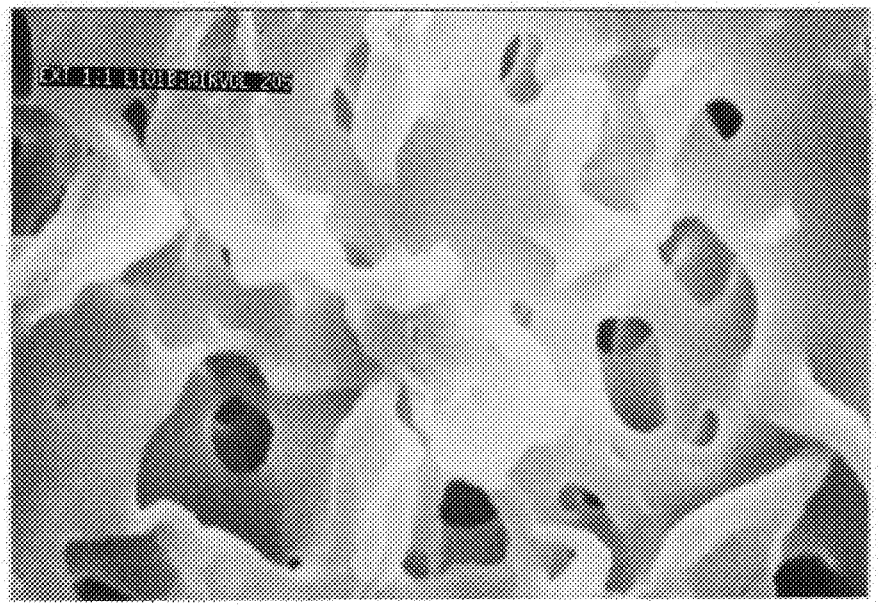
FIG. 6 is a photomicrograph of a blend composition prepared from "EVAL" L101B EVOH (32 mole percent ethylene, 113,500 $\overline{M_w}$) and "AIRVOL" 205 PVOH in a ratio of about 50:50 by weigh, after extraction, at a 5000× magnification.

FIGS. 5 and 6 are photomicrographs of extracted blend compositions 2(D) [prepared from "EVAL" F101A EVOH and "AIRVOL" 205 PVOH in a ratio of about 50:50 by weight] and 2(F) [prepared from "EVAL" L101B (32 mole percent ethylene, 132,000 $\overline{M_w}$) EVOH and "AIRVOL" 205

PVOH in a ratio of about 50:50 by weight], respectively, at a 5000× magnification. These figures illustrate the extracted compositions to be highly porous, with the domains penetrating therethrough having been occupied by the PVOH component prior to extraction.

EXAMPLE 3

In accordance with the preparation method described above, compositions were prepared using EVOH (with an ethylene content of about 38 mole percent, and a molecular weight of about 132,000 $\overline{M_w}$) and "AIRVOL" 205 PVOH in three different by weight ratios. A composition prepared from 100% EVOH was used for comparative purposes. All of these compositions were extrusion cast into films and were injection molded into tensile bars. Some physical properties of these compositions are presented below in Table III.

TABLE III

EVOH: 38 mole percent ethylene content, with $\overline{M_w}$ = 132,000
PVOH: 88% hydrolysis, with $\overline{M_w}$ = 20,000

| Blend | EVOH:PVOH | Tensile Modulus[a] Kpsi (MPa/6.9) | Viscosity[b] Pa · s | WVTR g/mil/100 in²/day |
|---|---|---|---|---|
| A | 100:0 | 610 | 240 | 24.9 |
| B | 83:17 | 660 | 234 | 42.9 |
| C | 66:34 | 725 | 238 | 123.4 |
| D | 50:50 | 770 | 239 | 178.9 |

[a]test method is ISO R527, 2 mm thick test bar, speed C
[b]at a shear rate of 2,000 (s⁻¹) as measured on Geottfert Rheograph at 210° C.

The results illustrated in Table III are consistent with those obtained in Examples 1 and 2.

EXAMPLE 4

In accordance with the preparation method described above, compositions were prepared using EVOH (with an ethylene content of about 44 mole percent, and a molecular weight of about 113,000 $\overline{M_w}$) and "AIRVOL" 205 PVOH in several different by weight ratios. A composition prepared from 100% EVOH was used for comparative purposes. All of these compositions were extrusion cast into films and were injection molded into tensile bars. Some physical properties of these compositions are presented below in Table IV.

The results illustrated in Table IV are consistent with those obtained in Examples 1 through 3.

Figure 7:
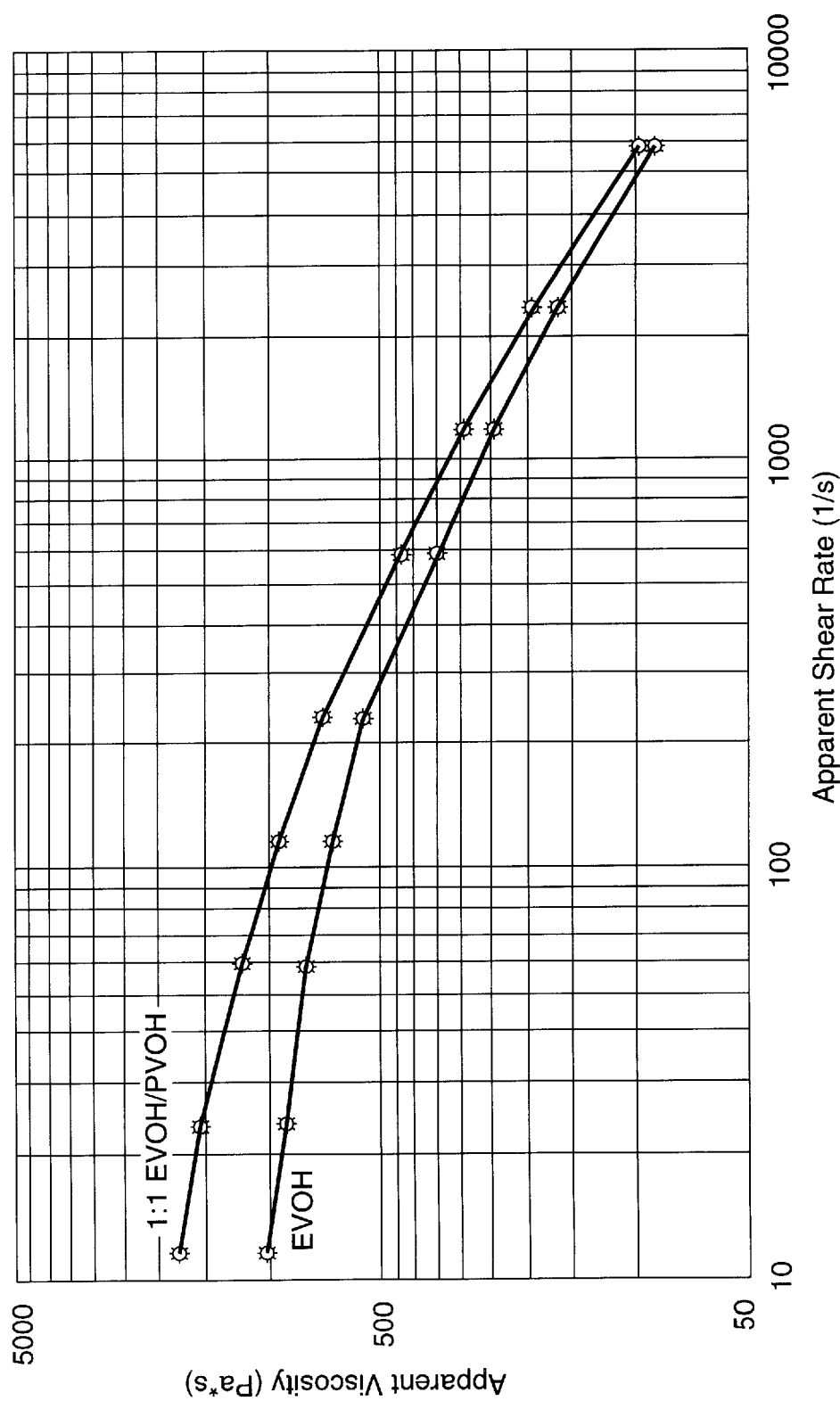
FIG. 7 is a chart showing the comparable viscosity of a composition prepared from 100% "SELAR-OH" 4416 (44 mole percent ethylene, 113,000 $\overline{M_w}$) EVOH with a blend composition prepared from that EVOH and "AIRVOL" 205 PVOH in a ratio of about 50:50 by weight.

As seen from Table IV, the processability of the blend compositions as reflected by its surprising rheological behavior for blend compositions 4(B) through 4(G), insofar as the apparent viscosities with respect to apparent shear rates of the blend compositions were comparable to that of the composition prepared from 100% EVOH [composition 7(A)]. Despite having been prepared in part from a non-thermoplast—PVOH—, the viscosities of the blend compositions were observed to be comparable to that of a composition prepared entirely from a thermoplast. For a comparison of the processability of blend composition 4(F) with composition 4(A), see FIG. 7.

Morphology
Extraction

Blend compositions 4(D) and 4(G) were each separately ground into a powder and extracted according to the method described above.

SEM Observations

Figure 8:
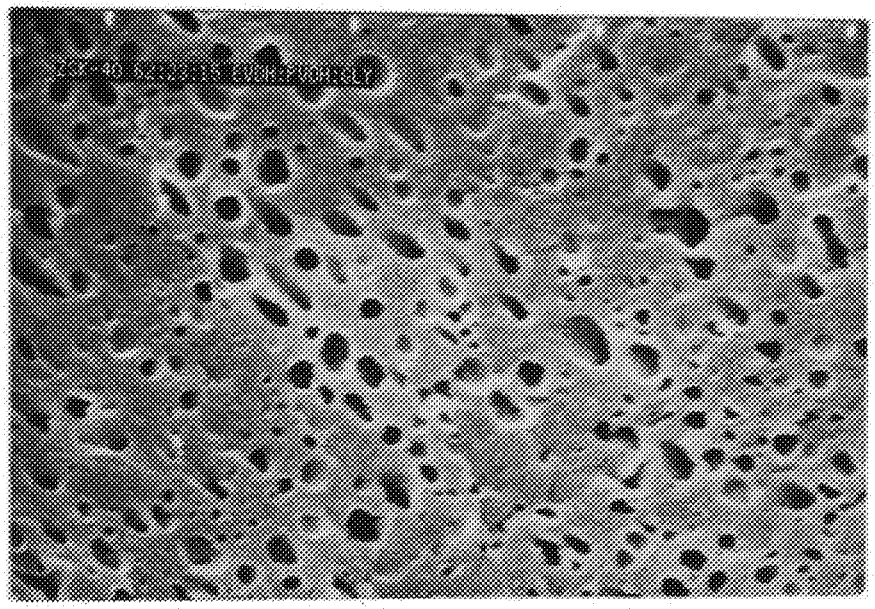
FIG. 8 is a photomicrograph of a blend composition prepared from "EVAL" E105A (44 mole percent ethylene, 113,000 $\overline{M_w}$) EVOH and "AIRVOL" 205 PVOH, with glycerin, in a ratio of about 62:23:15 by weight, after extraction, at a 5000× magnification.

As seen from FIG. 8, which is a photomicrograph of extracted blend composition 4(D) [prepared from "EVAL" E105A (44 mole percent ethylene, 113,000 $\overline{M_w}$) EVOH and "AIRVOL" 205 PVOH in a ratio of about 62:23 by weight, with about 15% by weight glycerin added] at a 5000× magnification, the morphology of the composition appears to consist of a dense, porous, sponge-like matrix.

Figure 9:
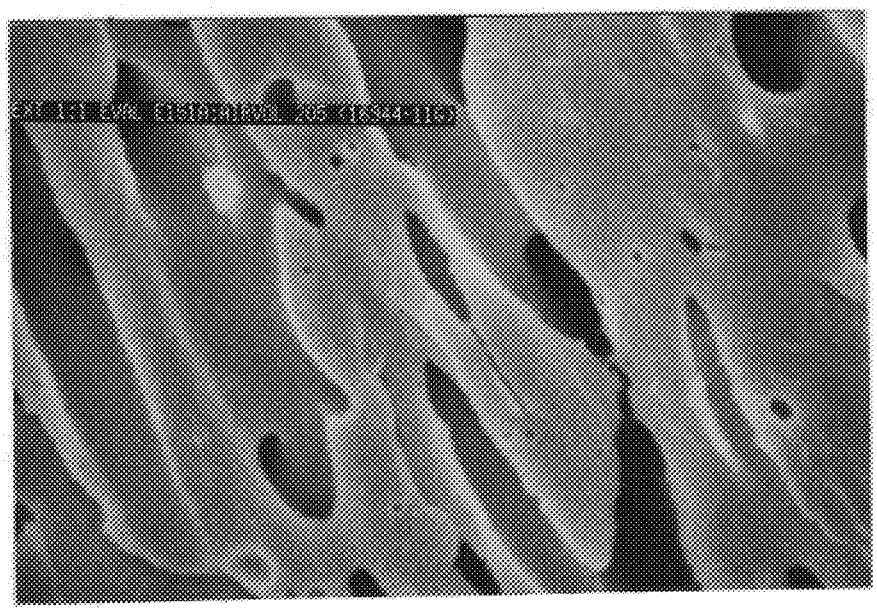
FIG. 9 is a photomicrograph of a blend composition prepared from "EVAL" E151A (44 mole percent ethylene, 145,400 $\overline{M_w}$) EVOH and "AIRVOL" 205 PVOH in a ratio of about 50:50 by weight, after extraction, at a 5000× magnification.

FIG. 9, which is a photomicrograph of extracted blend composition 4(G) [prepared from "EVAL" E151A (44 mole

TABLE IV

EVOH: 44 mole percent ethylene content, with $\overline{M_w}$ = 113,000
PVOH: 88% hydrolysis, with $\overline{M_w}$ = 20,000

| Blend | EVOH:PVOH | Tensile Modulus[a] Kpsi (MPa/6.9) | Viscosity[b] Pa · s | WVTR g/mil/100 in²/day |
|---|---|---|---|---|
| A | 100:0 | 516 | 166 | 14.4 |
| B | 90:10 | 563 | 170 | 15.4 |
| C | 83:17 | 579 | 176 | 24.1 |
| D | 62:23[c] | 115 | — | — |
| E | 66:34 | 654 | 187 | 52.3 |
| F | 50:50 | 763 | 191 | 109.7 |
| G | 50:50[d] | 802 | 270 | 760.0 |

[a]test method is ISO R527, 2 mm thick test bar, speed C
[b]at a shear rate of 2,000 (s⁻¹) as measured on Geottfert Rheograph at 210° C.
[c]glycerin added to blend composition 4 (D) in an amount equal to about 15 weight percent; prepared on Werner-Pfleiderer extruder
[d]EVOH: 44 mole percent ethylene content, with $\overline{M_w}$ = 145,400 percent ethylene, 145,400 $\overline{M_w}$) EVOH and "AIRVOL" 205 PVOH in a ratio of about 50:50 by weight] at a 5000× magnification, shows the morphology of the composition to be highly porous, the voids of which represent domains occupied by the PVOH component prior to extraction.

EXAMPLE 5

In accordance with the preparation method described above, compositions were prepared using "EVAL" G156B (with an ethylene content o about 48 mole percent, and a molecular weight of about 113,000 $\overline{M_w}$) EVOH and "AIRVOL" 205 PVOH in four different by weight ratios. A composition prepared from 100%. EVOH was used for comparative purposes. All of these compositions were extrusion cast into films and were injection molded into tensile bars. Some physical properties and characteristics are presented below in Table V.

TABLE V

EVOH: 48 mole percent ethylene content, with $\overline{M_w}$ = 113,000
PVOH: 88% hydrolysis, with $\overline{M_w}$ = 20,000

| Blend | EVOH:PVOH | Tensile Modulus[a] Kpsi (MPa/6.9) | Viscosity[b] Pa · s | WVTR g/mil/100 in$^2$/day |
|---|---|---|---|---|
| A | 100:0 | 469 | 129 | 10.7 |
| B | 83:17 | 521 | 141 | 11.7 |
| C | 66:34 | 596 | 158 | 15.6 |
| D | 50:50 | 616 | 172 | 35.1 |
| E | 34:66 | 837 | 172 | 49.8 |

[a]test method is ISO R527, 2 mm thick test bar, speed C
[b]at a shear rate of 2,000 (s$^{-1}$) as measured on Geottfert Rheograph at 210° C.

The results illustrated in Table V are consistent with those obtained in Examples 1 through 4.

In addition, a comparison of the tensile bars molded from the blend compositions of Example 1 with these molded in this example shows the modulus to decrease when the ethylene content of the EVOH component of the composition was increased from 27 mole percent to 48 mole percent (and the molecular weigh was decreased from about 132,000 $\overline{M_W}$ to about 113,000 $\overline{M_W}$).

Morphology

Figure 10:
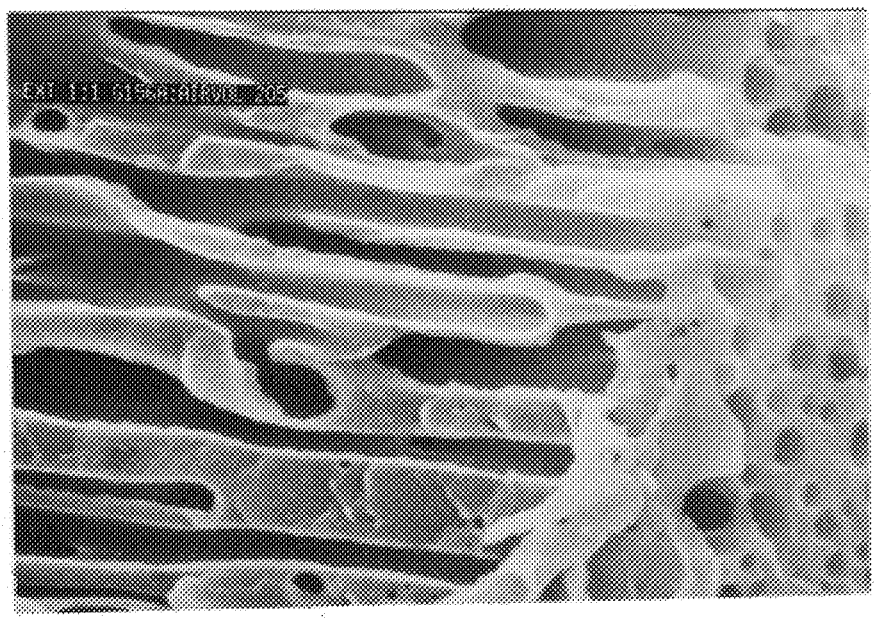
FIG. 10 is a photomicrograph of a blend composition prepared from "EVAL" G156B (48 mole percent ethylene, 113,000 $\overline{M_w}$) EVOH and "AIRVOL" 205 PVOH in a ratio of about 50:50 by weight, after extraction, at a 5000× magnification.

Blend compositions 5(D) and 5(E) were ground into a powder and extracted according to the method described above.
SEM Observations FIG. 10, which is a photomicrograph of extracted blend composition 5(D) [prepared from "EVAL" G156B EVOH and "AIRVOL" 205 PVOH in a ratio of about 50:50 by weight] at a 5000× magnification, shows a cross-sectional and longitudinal view which illustrates the permeation of the PVOH component through the matrix of the remaining EVOH component.

Figure 11:
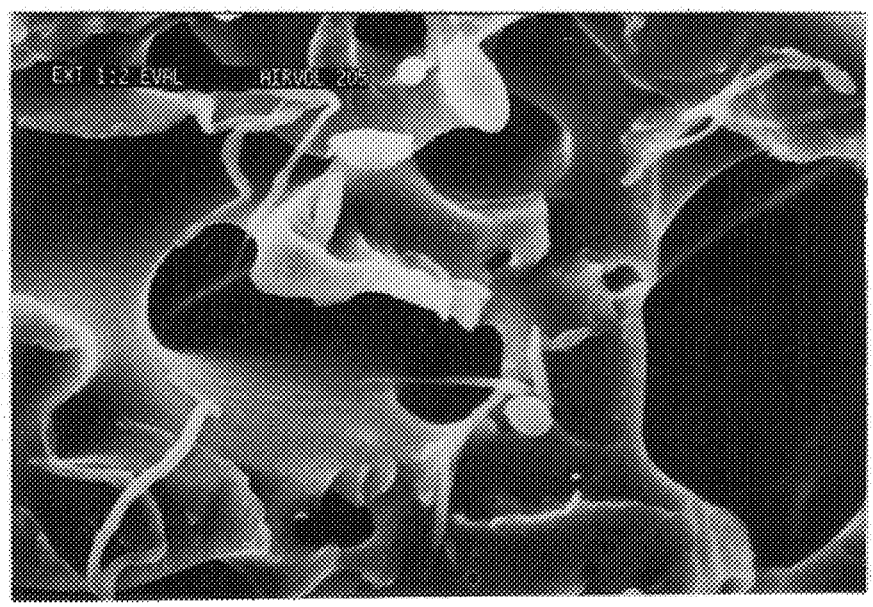
FIG. 11 is a photomicrograph of a blend composition prepared from "EVAL" G156B EVOH and "AIRVOL" 205 PVOH in a ratio of about 34:66 by weight, after extraction, at a 5000× magnification.

FIG. 11, which is a photomicrograph of extracted blend composition 5(E) [prepared from "EVAL" G156B EVOH and "AIRVOL" 205 PVOH in a ratio of about 34:66 by weight] at a 5000× magnification, shows a sponge-like matrix, with the domains appearing in the EVOH matrix due to the PVOH extraction.

EXAMPLE 6

In accordance with the preparation method described above, compositions were prepared using EVOH (with an ethylene content of about 27 mole percent, and a molecular weight of about 113,000 $\overline{M_W}$) and "AIRVOL" 203 (with a degree of hydrolysis of about 880%, and a molecular weight of about 11,800 $\overline{M_W}$) PVOH in three different by weight ratios. All of these compositions were injection molded into tensile bars and were extrusion cast into films. Some physical properties and characteristics are presented below in Table VI.

TABLE VI

EVOH: 27 mole percent ethylene content, with $\overline{M_w}$ = 113,000
PVOH: 88% hydrolysis, with $\overline{M_w}$ = 11,800

| Blend | EVOH:PVOH | Tensile Modulus[a] Kpsi (MPa/6.9) | Viscosity[b] Pa · s | WVTR g/mil/100 in$^2$/day |
|---|---|---|---|---|
| A | 50:50 | 980 | 187 | 13,000 |
| B | 34:66 | 950 | 160 | — |
| C | 25:75 | 947 | 157 | — |

[a]test method is ISO R527, 2 mm thick test bar, speed C
[b]at a shear rate of 2,000 (s$^{-1}$) as measured on Geottfert Rheograph at 210° C.

The results illustrated in Table VI are consistent with those obtained in Examples 1 through 5.

A comparison of the blend compositions of Example 1 with those of this example [specifically, blend compositions 1(E) and 1(G) with blend compositions 6(A) and 6(B), respectively] indicate that when the molecular weight of the PVOH component was decreased from about 20,000 $\overline{M_W}$ to about 11,800 $\overline{M_W}$, the viscosity was observed to decrease and the modulus of the tensile bars manufactured therefrom was observed to increase.

EXAMPLE 7

Effect of Variance in EVOH $\overline{M_W}$ on Rheology of Blend Compositions This example illustrates the effect of EVOH $\overline{M_W}$ variation on the physical properties and characteristics of thermoplastic polymer blend compositions. Compositions were prepared as described above, although the Brabender extruder was employed instead of the Berstorff extruder. In blend compositions 7(C) and 7(D), EVOH (with an ethylene content of about 32 mole percent, and a molecular weight of about 132,000 $\overline{M_W}$ and about 113,800 $\overline{M_W}$, respectively) and "AIRVOL" 205 PVOH were melted and blended together in a ratio of about 50:50 by weight. In compositions 7(G) and 7(H), EVOH (with an ethylene content of about 44 mole percent, and a molecular weight of about 145,000 $\overline{M_W}$ and about 113,000 $\overline{M_W}$, respectively) and "AIRVOL" 205 PVOH were melted and blended together in a ratio of about 50:50 by weight. Compositions were also prepared from EVOH having both ethylene contents and molecular weights and used for comparative purposes. All of these compositions were injection molded into tensile bars and were extrusion cast into films. Some physical properties and characteristics are presented below in Tables VII(a) and VII(b).

The results illustrated in Tables VII(a) and VII(b) are consistent with those observed in Examples 1 through 6.

The processability of the composition was observed to increase when the molecular weight of the EVOH component of the composition was decreased. That is, a decrease in the apparent viscosities with respect to apparent shear rates were observed for the blend compositions in which the molecular weight of the EVOH component of the composition was decreased from about 145,000 $\overline{M_W}$ to about 113,000 $\overline{M_W}$ for the 44 mole percent ethylene EVOH, and from about 132,000 $\overline{M_W}$ to about 113,500 $\overline{M_W}$ for the 32 mole percent ethylene EVOH.

The WVTR was observed to remain unchanged for the extruded films when the molecular weight of the EVOH component of the blend compositions was increased within the range of about 113,000 $\overline{M_W}$ to about 145,000 $\overline{M_W}$ for 44 mole percent ethylene EVOH, and from about 113,800 $\overline{M_W}$ to about 132,000 $\overline{M_w}$ for 32 mole percent ethylene EVOH.

EXAMPLE 8

Effect of Variance in PVOH $\overline{M_W}$ and Degree of Hydrolysis on Rheology of Blend Compositions In Example 8, the effect of varying the molecular weight and the degree of hydrolysis of the PVOH component on the morphology of the blend compositions was observed. In this regard, "EVAL" L101A EVOH was blended together with four "AIRVOL" PVOHs, with each PVOH having a different molecular weight. Properties of these compositions are presented in Table VIII(a). Some of these compositions were injection molded and were extrusion cast into films. In Table TABLE VII (a)

EVOH: 32 mole percent ethylene content
PVOH: 88% hydrolysis, with $\overline{M_w}$ = 20,000

| Blend | EVOH:PVOH | Tensile Modulus[a] Kpsi (MPa/6.9) | Viscosity[b] Pa · s | WVTR g/mil/100 in²/day | EVOH ($\overline{M_w}$) |
|---|---|---|---|---|---|
| A | 100:0 | 695 | 240 | 860 | 132,000 |
| B | 100:0 | 740 | 224 | 612 | 113,800 |
| C | 50:50 | 880 | 239 | 4300 | 132,000 |
| D | 50:50 | 925 | 192 | 3351 | 113,800 |

[a]test method is ISO R527, 2 mm thick test bar, speed C
[b]at a shear rate of 2,000 (s⁻¹) as measured on Geottfert Rheograph at 210° C.

TABLE VII (b)

EVOH: 44 mole percent ethylene content
PVOH: 88% hydrolysis, with $\overline{M_w}$ = 20,000

| Blend | EVOH:PVOH | Tensile Modulus[a] Kpsi (MPa/6.9) | Viscosity[b] Pa · s | WVTR g/mil/100 in²/day | EVOH ($\overline{M_w}$) |
|---|---|---|---|---|---|
| E | 100:0 | 501 | 192 | 83 | 145,000 |
| F | 100:0 | 516 | 172 | 90 | 113,000 |
| G | 50:50 | 802 | 205 | 760 | 145,000 |
| H | 50:50 | 763 | 192 | 106 | 113,000 |

[a]test method is ISO R527, 2 mm thick test bar, speed C
[b]at a shear rate of 2,000 (s⁻¹) as measured on Geottfert Rheograph at 210° C.

VIII(b), four additional blend compositions were prepared, with the PVOH component having a different degree of hydrolysis for three of these four blend compositions.

blend compositions to determine the extent of oxygen permeation. Blend compositions were prepared from 27 mole percent and 48 mole percent ethylene EVOH and "AIR-VOL" 205 PVOH in a ratio of about 50:50 by weight, and thereafter extruded into films in accordance with the method above.

TABLE VIII (a)

EVOH: 27 mole percent ethylene content, with $\overline{M_w}$ = 132,000
PVOH: 88% hydrolysis

| Blend | EVOH:PVOH | Tensile Modulus[a] Kpsi (MPa/6.9) | Viscosity[b] Pa · s | WVTR g/mil/100 in$^2$/day | PVOH ($\overline{M_w}$) |
|---|---|---|---|---|---|
| A | 25:75 | 947 | — | 134 | 11,800 |
| B | 34:66 | 950 | — | — | 11,800 |
| C | 50:50 | 980 | 187 | 13,000 | 11,000 |
| D | 50:50 | 920 | 253 | 8,000 | 20,000 |
| E | 50:50 | 1001 | 320 | 5,000 | 74,000 |
| F | 50:50 | 1120 | 450 | 5,200 | 128,000 |

[a]test method is ISO R527, 2 mm thick test bar, speed C
[b]at a shear rate of 2,000 (s$^{-1}$) as measured on Geottfert Rheograph at 210° C.

TABLE VIII (b)

EVOH: 27 mole percent ethylene content, with $\overline{M_w}$ = 132,000

| Blend | EVOH:PVOH | PVOH percent hydrolysis | PVOH ($\overline{M_w}$) |
|---|---|---|---|
| G | 34:66 | 88 | 20,000 |
| H | 50:50[a] | 88 | 20,000 |
| I | 50:50[b] | 98 | 15,000 |
| J | 50:50 | 71 | 30,000 |

Figure 12:
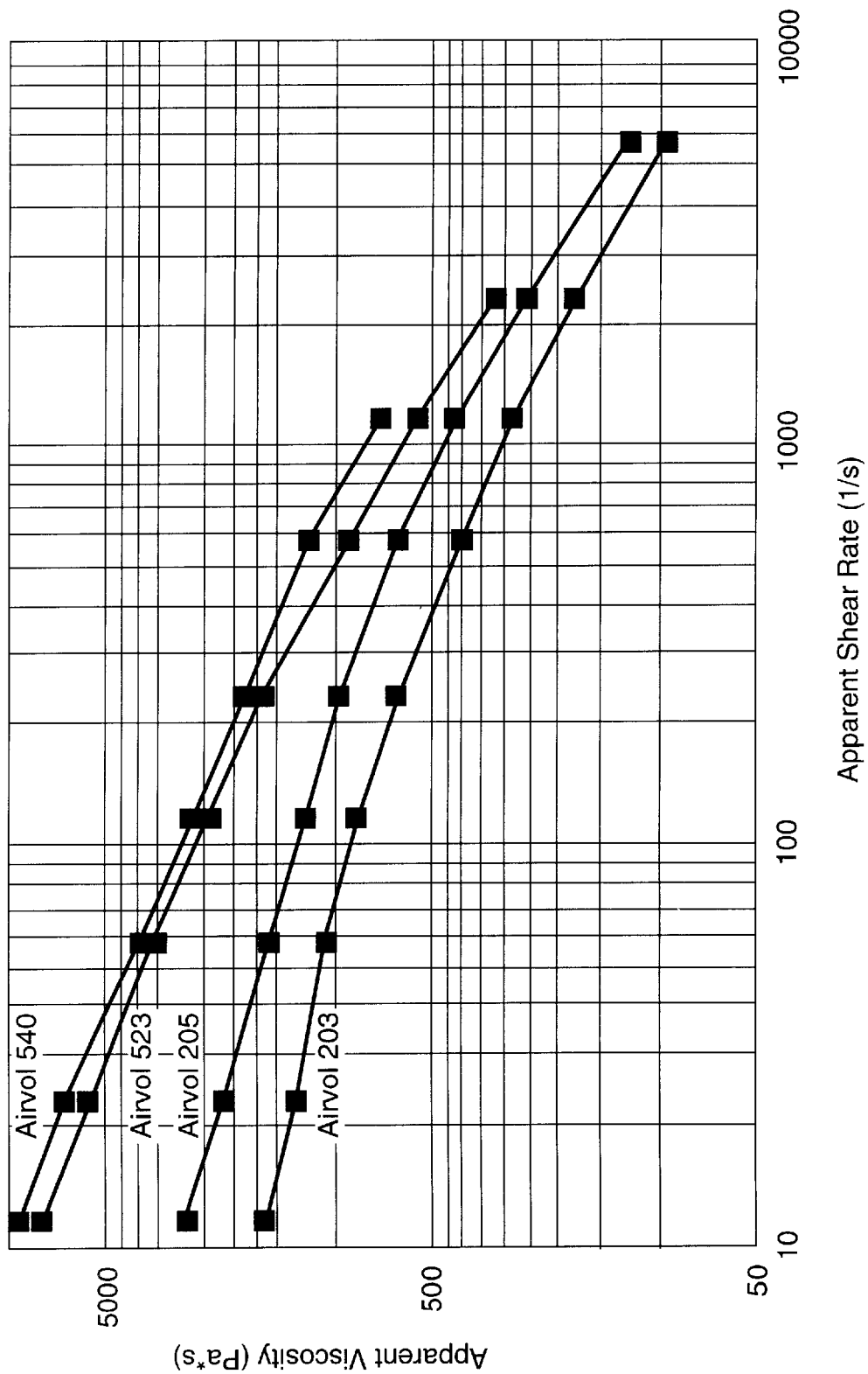
FIG. 12 is a chart showing the apparent shear rate as a function of the apparent viscosity of blend compositions prepared from "EVAL" L101A and "AIRVOL" PVOHs at four different weight average molecular weights.

[a]with lubricant added by manufacturer
[b]not extrusion processable into a quality blend Effect of Variance in PVOH $\overline{M_W}$ and on Rheology of Blend Compositions The modulus was observed to increase when the molecular weight of the PVOH was increased. Specifically, when the molecular weight of the PVOH component was increased from about 11,800 $\overline{M_W}$ ("AIRVOL" 203) to about 128,000 $\overline{M_W}$ ("AIRVOL" 540), the modulus was observed to increase. The processability of the compositions was observed to improve as the molecular weight of the PVOH component was increased, with the EVOH and PVOH components held constant in a ratio of about 50:50 by weight. As seen from FIG. 12, the processability of the compositions is reflected through its surprising Theological behavior for the blend compositions 8(C) through 8(F), insofar as the apparent viscosities with respect to apparent shear rates were comparable to one another.

Effect of Variance in PVOH Degree of Hydrolysis on Rheology of Blend Composition In Table VIII(b), blend compositions are presented in two different by weight ratios with "EVAL" L101A EVOH and PVOH with three different degrees of hydrolysis. While the blend compositions prepared with the PVOH of a 71% and 88% degree of hydrolysis could be prepared and thereafter injection molded into shaped articles of manufacture under the processing conditions described herein, the blend composition presented with the PVOH of a 98% degree of hydrolysis could not be processed under those conditions.

EXAMPLE 9

Oxygen Permeation

Since gas permeation is an important property for food and beverage packaging, films were extruded from several blend compositions to determine the extent of oxygen permeation. Blend compositions were prepared from 27 mole percent and 48 mole percent ethylene EVOH and "AIR-VOL" 205 PVOH in a ratio of about 50:50 by weight, and thereafter extruded into films in accordance with the method above.

The extruded films were analyzed to determine the rate of oxygen permeation with an OX-Tran 2/20 Oxygen Permeation Analyzer (Modern Controls Inc., Minneapolis, Minn.), the results of which are shown in Table IX below. The films, having a two-dimensional area of 50 cm$^2$ and a thickness of about 1 mil, were conditioned at a temperature of about 23° C. and a relative humidity of about 0% RH for a period of time of about 16 hours. The oxygen permeation rate was observed to increase for the blend composition and for films extruded from the composition prepared from 100% EVOH, containing 48 mole percent ethylene EVOH as compared with 27 mole percent ethylene EVOH. In addition, the oxygen permeation rate was observed to decrease with an increase in the ethylene content of the EVOH component of the composition.

TABLE IX

Oxygen Permeation

| Blend | Ratio | EVOH mole percent ethylene | Oxygen transmission rate (cc/mil/100 in$^2$/day) |
|---|---|---|---|
| EVOH | 100:0 | 27 | 0.039 |
| EVOH | 100:0 | 48 | 0.748 |
| EVOH:PVOH | 50:50 | 27 | 0.030 |
| EVOH:PVOH | 50:50 | 48 | 0.601 |

EXAMPLE 10

Biodegradation

Biodegradation was determined by Standard Test Method for Determining the Aerobic Biodegradation of Plastic Materials in an Activated Sludge Wastewater Treatment System [see ASTM D5271 (1993)]. This method, performed in a respirometer, was used to provide information concerning the extent to, and the rate at, which biodegradation of the compositions of the present invention occurred by aerobic microorganisms in an aqueous environment. The respirometer measures the oxygen consumed by an inoculum of microorganisms, and the oxygen consumed by an inoculum exposed to the compositions of the present invention having a chemical oxygen demand (COD).

Fully oxidized sludge from a waste-water treatment plant was used as inoculum for the liquid medium of the respirometer. The medium also contained (1) buffers to maintain a near neutral pH and (2) inorganic nutrients to maintain an adequate nutrient supply for metabolism. The organic carbon sources in the medium were the microorganisms and any residual organic material contained in the sludge sample. Allyl thiourea was added to suppress nitrification (the biological oxidation of ammonia), which is known to often interfere with the measurement of oxygen consumption. In this environment, all of the oxygen demand exerted by the microorganisms was attributed to mineralization of the carbonaceous compounds in the medium, which was confirmed by concentration measurements made for ammonia, nitrate and nitrite.

The method was conducted in an electrolytic respirometer having 24 independent reactor-electrolytic cell assemblies. These self-contained units consist of a reactor, an electrolytic cell and a carbon dioxide absorbent vessel. The cell assemblies were housed in a covered, temperature-controlled water bath that was maintained a, a temperature of about 25° C. For a further discussion of electrolytic respirometry see Young et al., "An Improved Apparatus for Biochemical Oxygen Demand," *Anal. Chem.*, 37, 784 (1965) and Young and Bauman, "The Electrolytic Respirometer I. Factors Affecting Oxygen Uptake Measurements," *Water Res.*, 10, 1031 (1976).

As baseline respiration for the inoculum, respirometer cells were used which contained only the medium. To perform the biodegradation determinations, a blend composition of the present invention was added to the medium-containing respirometer cells.

The applied COD of the blend composition was determined from its mass, water content and COD, each of which was measured on a dry-weight basis.

As the microorganisms metabolized organic materials for energy, oxygen was consumed and carbon dioxide was produced within the respirometric cell. The produced carbon dioxide was transferred into the gas space of the cell where it was absorbed by a 5N solution of potassium hydroxide contained therein. As the oxygen was consumed and the carbon dioxide was absorbed in the potassium hydroxide solution, the gas volume in the respirometer cell decreased. Once detected, a monitored amount of oxygen was added, which amount was integrated and recorded by a computer as cumulative oxygen consumption. Table X below shows some of the information gleaned from this method.

In Column 2, representative values are presented for cumulative oxygen consumption after 77 days of testing for: (i) the inoculum; (ii) the inoculum with 100% EVOH (44 mole percent ethylene, 113,000 $\overline{M_w}$); (iii) the inoculum with 100% PVOH (88% hydrolysis, 20,000 $\overline{M_w}$); (iv) a composition of the present invention EVOH and PVOH in a ratio of about 68:32 by weight; and (v) a mixture of EVOH and PVOH in a ratio of about 67:33 by weight The net oxygen consumption (that amount of oxygen used by the inoculum in order to oxidize the test material) is determined by subtracting the cumulative oxygen consumption of the inoculum from the cumulative oxygen consumption of the inoculum containing a test material. This value is shown in Column 3. The net oxygen consumption divided by the applied COD as PVOH (see Column 4) determines the percentage of the PVOH oxygen demand met (see Column 5). In Column 6, the concentration of EVOH applied to various respirometer cells is listed. Column 7 shows the concentration of COD as EVOH met.

These results indicate that the EVOH component biodegrades in the presence of the PVOH component at a rate which is significantly greater than that for EVOH alone. Further, the rate of biodegradation of the EVOH component of the blend composition was enhanced to a greater extent than that of the EVOH which was merely mixed with the PVOH. These observations are due to the co-continuous phase morphology assumed by the blend compositions which encourages the growth of microorganisms in biologically active systems to provide increased surface area of the EVOH component thereby facilitating at an enhanced rate its biodegradation. The information provided by Example 11 below confirms these observations.

EXAMPLE 11

Radiolabelled Biodegradation
Synthesis of Radiolabelled Ethylene and Copolymerization Thereof with Vinyl Alcohol The $^{14}$C-radiolabelled ethylene-vinyl alcohol copolymer was produced in two-steps.

In the first step, $^{14}$C-radiolabelled ethylene-vinyl acetate copolymer was synthesized via a free-radical polymerization of $^{14}$C-radiolabelled ethylene and vinyl acetate in an all stainless steel pressure vessel (Parr Instruments, Inc., Molaine, Ill.).

Into this pressure vessel was placed vinyl acetate (about 100.0 grams), azo-bis-(isobutyronitrile) (about 0.057 grams) as an initiator, and methanol (about 5.4 grams) as a chain

TABLE X

| | Biodegradation | | | | | |
|---|---|---|---|---|---|---|
| 1 Case | 2 Cumultv oxygen consumpt (mg/L) | 3 Net Oxygen consumpt (mg/L) | 4 Applied COD as PVOH (mg/L) | 5 COD demand of PVOH met (%) | 6 applied COD as EVOH (mg/L) | 7 COD demand of EVOH met (mg/L) |
| Inoculum (i) | 421 | — | 0 | — | 0 | — |
| EVOH (ii) | 424 | 3 | 0 | — | 301 | 3 |
| PVOH (iii) | 701 | 280 | 308 | 91 | 0 | — |
| EVOH (iv) | 573 | 152 | 81 | 91[a] | 224 | 78 |
| EVOH (v) | 545 | 121 | 82 | 91[a] | 223 | 46 |

[a]Assumes the percent oxygen demand met for the PVOH in the blend and mixture was equal to the 91 percent value measured for the PVOH control (iii). This level is typical for long-term respirometry tests with water-soluble PVOH.

transfer agent. The pressure vessel was sealed and deoxygenated with purified nitrogen for a period of time of about 15 minutes. After cooling the vessel in liquid nitrogen, $^{14}$C-radiolabelled ethylene [about 0.056 grams, 55 mci/mmole (supplied by American Radiochemicals Laboratory, St. Louis, Mo.)] was introduced thereto with a standard vacuum-line technique. The vessel was then charged with ethylene until the vessel equilibrated to an internal pressure of about 500 psi. The temperature of the vessel was then elevated to about 60° C., and maintained at that temperature for a period of time of about 4 hours. After which time, the vessel was cooled to a temperature of about 30° C. and the pressure slowly released.

The crude $^{14}$C-radiolabelled ethylene-vinyl acetate copolymer that formed was precipitated by pouring the total reaction mixture into a well-stirred 1:9 by volume methanol:water non-solvent. To purify the crude radiolabelled copolymer, it was dissolved in acetone and precipitated therefrom with water. The resulting $^{14}$C-radiolabelled ethylene-vinyl acetate polymer was dried in vacuo at a temperature of about 60° C. for a period of time of about 12 hours.

In the second step of the synthesis, the $^{14}$C-radiolabelled ethylene-vinyl acetate copolymer was saponified with methanolic NaOH to afford the $^{14}$C-labelled ethylene-vinyl alcohol copolymer. Specifically, $^{14}$C-radiolabelled ethylene-vinyl acetate copolymer (about 10 grams) was placed in a 1-liter resin kettle and dissolved in methanol (about 160 milliliters) at a temperature of about 60° C. To this solution was added with stirring about 10 milliliters of a solution prepared from about 80 grams NaOH in about 1 liter of methanol. The stirring was allowed to continue for a period of time of about 30 minutes while nitrogen was slowly bubbled therethrough to expel methyl acetate, which was formed as a by-product. An additional 10 milliliter portion of the methanolic NaOH was added to the mixture, and nitrogen was bubbled therethrough for an additional period of time of about 2 hours. Glacial acetic acid (2 milliliters) was then added to neutralize the mixture, with the vessel cooled in an ice bath until the mixture was completely coagulated.

The coagulated $^{14}$C-radiolabelled ethylene-vinyl alcohol copolymer was vacuum filtered through a medium porosity fritted funnel. The filtrate was mixed with about 400 milliliters of a solution prepared from about 0.5 grams acetic acid in about 1 liter of water. The resulting slurry was stirred for a period of time of about 30 minutes, and then filtered. This procedure was repeated 3 times, whereupon the final product was dried in vacuo at a temperature of about 60° C. for a period of time of about 1 to 2 hours and then dried further in vacuo at a temperature in the range of from about 90° C. to about 100° C. for a period of time of about 15 hours. The $^{14}$C-radiolabelled EVOH was determined to have an ethylene content of about 46 mole percent, a molecular weight of about 78,000 $\overline{M_W}$ and a specific activity of about 0.59 mci/gram.

Preparation of Radiolabelled Blend Composition

A blend composition was prepared from the $^{14}$C-radiolabelled EVOH arid PVOH in a ratio of about 56:44 by weight according to the method described in Example 1 above. This $^{14}$C-radiolabelled blend composition was observed to exhibit rheological characteristics similar to the blend compositions prepared from EVOH and PVOH with similar physicals parameters in a similar by weight ratio.

Biodegradation of Radiolabelled Blend Composition

The same biodegradation test method was used as that in Example 10. However, in this method $^{14}$C-containing carbon dioxide was collected into an absorbent at regular intervals and measured by scintillation counting, instead of discarding it without analysis as is the practice in a typical biodegradation method. The measured amount of $^{14}$C-containing carbon dioxide correlated to the mineralization of the ethylene portion of the EVOH component of the blend composition.

Figure 13:
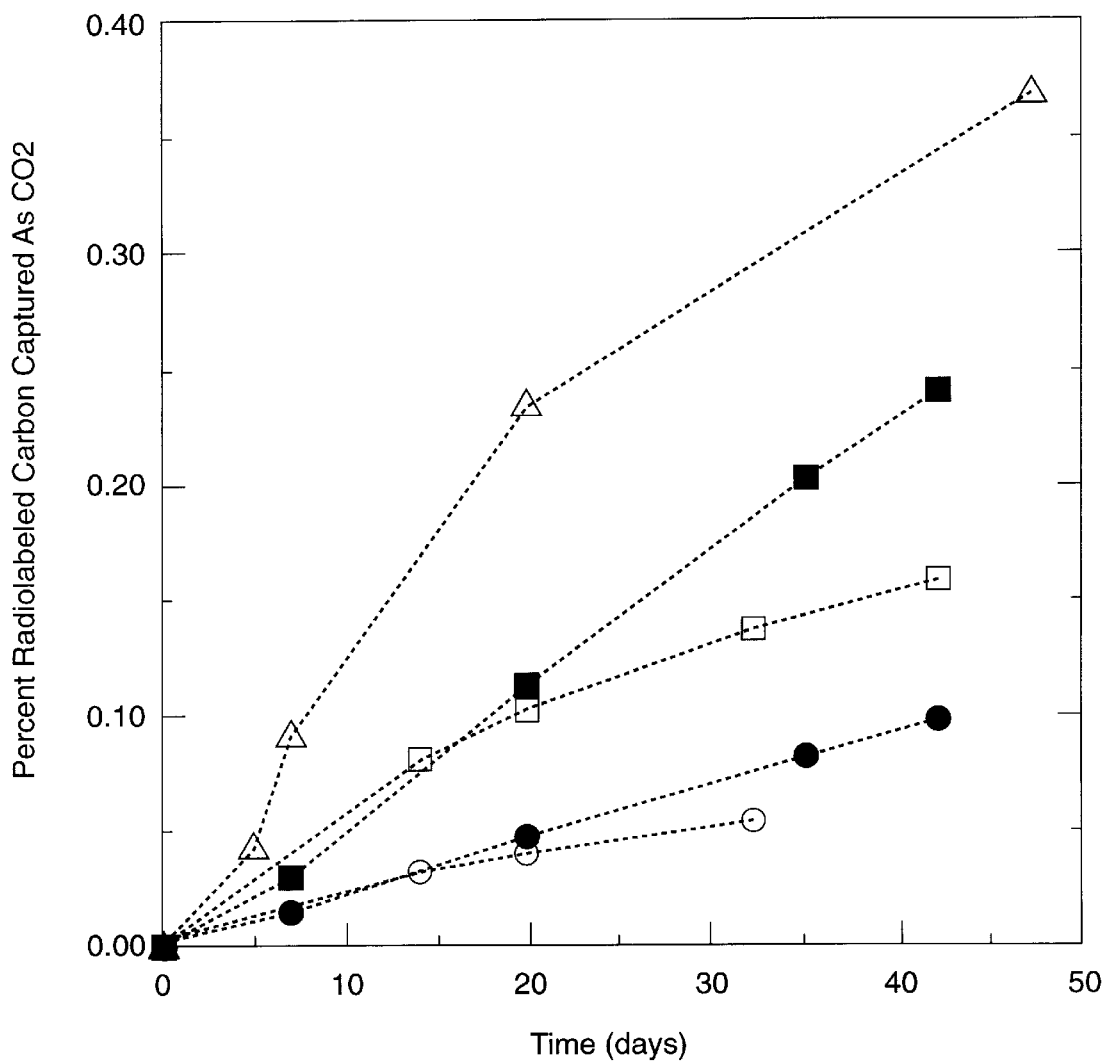
FIG. 13 is a chart showing the extent of biodegradation of (a) EVOH (represented by ○); (b) EVOH mixed with PVOH (represented by ●); (c) a blend composition of the present invention (represented by ∆); (d) the composition of (c) after extraction (represented by ☐); and (e) the composition of (c) after extraction with PVOH mixed therewith (represented by ■), with the extent of biodegradation of each measured as a function of percent $^{14}$C-radiolabelled carbon captured as carbon dioxide.

As illustrated by FIG. 13, the blend composition of the present invention (represented by Δ) shows an enhanced rate of biodegradation over that of a mixture of those components used to prepare the composition (represented by ●). A comparison of the biodegradation of EVOH (represented by ○) with that of the EVOH remaining from the blend composition after extraction (represented by □) shows the extent of biodegradation for the residual EVOH to be greater than 2.5 times as that of the biodegradation for EVOH (represented by ○). The effect of the inclusion of the PVOH component in the blend composition is demonstrated through a comparison of the rates of biodegradation of EVOH (○) and the residual EVOH (□) with that of those same materials in which PVOH was added to the inoculum on a weekly basis as a nutrient supplement (● and ■, respectively). Accordingly, the combined effect of increased surface area for the EVOH component and supplementing the inoculum with PVOH shows biodegradation results consistent with the results obtained from the blend composition (Δ).

Many variations and modifications of this invention are contemplated without departing from the scope or spirit of the invention, which is defined by the appended claims.

What is claimed is:

1. A biodegradable thermoplastic polymer blend composition suitable for use in the manufacture of shaped articles comprising at least one first polymer, wherein the first polymer is obtained by the co-polymerization of vinyl acetate and an alkene, with subsequent hydrolysis of all or substantially all of the vinyl ester groups to form vinyl alcohol groups and wherein the molar ratio of vinyl alcohol units to alkene units is within the range of from about 80:20 to about 50:50, and at least one second polymer, wherein the second polymer is polyvinyl alcohol which has been partially converted from polyvinyl acetate, with a degree of hydrolysis of within the range of from about 71% to about 98%, wherein the rate at which the second polymer biodegrades is greater than the rate at which the first polymer biodegrades, wherein the first polymer and the second polymer are processed in intimate association to form a uniform, substantially homogeneous blend composition, whereupon cooling the blend composition, co-continuous phases of the first polymer and of the second polymer may be observed and essentially all of the co-continuous phase of either of the polymers is extractable from the blend composition, and wherein when the blend composition is subjected to conditions favorable for biodegradation, the rate at which the first polymer biodegrades is enhanced by the second polymer.

2. The composition according to claim 1, wherein in the first polymer the molar ratio of vinyl alcohol units to alkene units is from about 73:27 to about 52:48.

3. The composition according to claim 1, wherein the first polymer has a weight average molecular weight of from about 5,000 $\overline{M_W}$ to about 300,000 $\overline{M_W}$.

4. The composition according to claim 1, wherein the first polymer has a weight average molecular weight of about 60,000 $\overline{M_W}$.

5. The composition according to claim 1, wherein the polyvinyl alcohol has been partially converted from polyvinyl acetate with a degree of hydrolysis of about 88%.

6. The composition according to claim 1, wherein the polyvinyl alcohol has a weight average molecular weight of from about 10,000 $\overline{M_W}$ to about 50,000 $\overline{M_W}$.

7. The composition according to claim 1, wherein the polyvinyl alcohol has a weight average molecular weight of about 20,000 $\overline{M_W}$.

8. The composition according to claim 1, wherein the ethylene-vinyl alcohol copolymer component and the polyvinyl alcohol component are present in the composition in a ratio of from about 95:5 to about 25:75 by weight.

9. The composition according to claim 8, wherein the ethylene-vinyl alcohol copolymer component and the polyvinyl alcohol component are present in a ratio of about 60:40 to about 40:60 by weight.

10. The composition according to claim 9, wherein the ethylene-vinyl alcohol copolymer component and the polyvinyl alcohol component are present in a ratio of about 50:50 by weight.

11. The composition according to claim 1, wherein the first polymer and the second polymer are blended under high shear conditions.

12. The composition according to claim 1, wherein the first polymer and the second polymer are blended at a temperature greater than the melting point of the first polymer.

13. The composition according to claim 1, wherein the first polymer and the second polymer are blended in a solution preparation.

14. A process for preparing a biodegradable thermoplastic polymer blend composition, said process comprising the step of blending (a) a first polymer, wherein the first polymer is obtained by the co-polymerization of vinyl acetate and an alkene, with subsequent hydrolysis of all or substantially of the vinyl ester groups to form vinyl alcohol groups and wherein the molar ratio of vinyl alcohol units to alkene units is within the range of from about 80:20 to about 50:50, with (b) a second polymer, wherein the second polymer is polyvinyl alcohol which has been partially converted from polyvinyl acetate, with a degree of hydrolysis of within the range of from about 71% to about 98%, in intimate association under high shear conditions to form a uniform, substantially homogenous blend composition, whereupon cooling the blend composition, co-continuous phases of the first polymer and of the second polymer may be observed and essentially all of the co-continuous phase of either of the polymers is extractable from the blend composition.

15. The process according to claim 14, wherein when the blend composition is subjected to conditions favorable for biodegradation, the rate at which the first polymer biodegrades is enhanced by the second polymer.

16. The process according to claim 14, wherein the first polymer and the second polymer are blended at a temperature greater than the melting point of the first polymer.

17. The process according to claim 14, wherein the first polymer and the second polymer are blended in a solution preparation.

* * * * *